US010713984B2

United States Patent
Wen

(10) Patent No.: US 10,713,984 B2
(45) Date of Patent: Jul. 14, 2020

(54) IMAGE DISPLAY CONTROL DEVICE AND IMAGE DISPLAY CONTROL METHOD

(71) Applicant: SONY CORPORATION, Tokyo (JP)

(72) Inventor: Shihhao Wen, Tokyo (JP)

(73) Assignee: SONY CORPORATION, Tokyo (JP)

( * ) Notice: Subject to any disclaimer, the term of this patent is extended or adjusted under 35 U.S.C. 154(b) by 21 days.

(21) Appl. No.: 16/073,659

(22) PCT Filed: Jan. 12, 2017

(86) PCT No.: PCT/JP2017/000780
§ 371 (c)(1),
(2) Date: Jul. 27, 2018

(87) PCT Pub. No.: WO2017/149943
PCT Pub. Date: Sep. 8, 2017

(65) Prior Publication Data
US 2019/0035314 A1    Jan. 31, 2019

(30) Foreign Application Priority Data
Mar. 2, 2016    (JP) .................................. 2016-039831

(51) Int. Cl.
*C09G 3/00*    (2006.01)
*G09G 5/10*    (2006.01)
(Continued)

(52) U.S. Cl.
CPC ........... *G09G 3/002* (2013.01); *G03B 21/145* (2013.01); *G03B 21/206* (2013.01); *G03B 21/62* (2013.01);
(Continued)

(58) Field of Classification Search
CPC ........... G09G 3/002; G09G 2320/0626; G03B 21/142; G03B 21/206; G03B 21/2053; H04N 9/3155
See application file for complete search history.

(56) References Cited

U.S. PATENT DOCUMENTS

| 5,270,752 A | 12/1993 | Kataoka et al. |
| 6,650,472 B1 * | 11/2003 | Adachi ................ G02B 3/0012 348/E9.027 |

FOREIGN PATENT DOCUMENTS

| JP | 2000-305481 A | 11/2000 |
| JP | 2011-102847 A | 5/2011 |

(Continued)

OTHER PUBLICATIONS

Diverdi, et al., "A Novel Walk-through 3D Display", Proceedings of SPIE vol. 6055 (Stereoscopic Displays and Virtual Reality Systems XIII), Jan. 15-18, 2006, 10 pages.
(Continued)

*Primary Examiner* — Kent W Chang
*Assistant Examiner* — Chayce R Bibbee
(74) *Attorney, Agent, or Firm* — Chip Law Group

(57) ABSTRACT

An image display control device includes a light source that executes image output to a transmission type screen, the transmission type screen that receives irradiation light from the light source, a control unit that controls at least one of the light source or the transmission type screen, and a control parameter calculation unit that calculates a control parameter defining a control mode of the control unit. The control parameter calculation unit sets, as input information, position information of a viewing user observing an image on the transmission type screen, and setting information of at least one of the light source or the transmission type screen, and on the basis of the input information calculates a control parameter, and outputs the control parameter to the control
(Continued)

unit, and the control unit executes control of the light source or the transmission type screen on the basis of the control parameter.

15 Claims, 17 Drawing Sheets

(51) Int. Cl.
  *G03B 21/62*  (2014.01)
  *H04N 9/31*  (2006.01)
  *G03B 21/20*  (2006.01)
  *G09G 3/00*  (2006.01)
  *G09G 5/00*  (2006.01)
  *G03B 21/14*  (2006.01)

(52) U.S. Cl.
  CPC .............. *G09G 5/00* (2013.01); *G09G 5/10* (2013.01); *H04N 9/3155* (2013.01); *H04N 9/3179* (2013.01); *H04N 9/3194* (2013.01); *G09G 2320/0626* (2013.01); *G09G 2320/08* (2013.01)

(56) References Cited

FOREIGN PATENT DOCUMENTS

| JP | 2013-195865 A | 9/2013 |
| JP | 2014-115343 A | 6/2014 |
| JP | 2015-212840 A | 11/2015 |

OTHER PUBLICATIONS

Plasencia, et al., "MisTable: Reach-Through Personal Screens for Tabletops", Proceedings of ACM CHI 2014 Conference on Human Factors in Computing Systems, 2014, 11 pages.

International Search Report and Written Opinion of PCT Application No. PCT/JP2017/000780, dated Apr. 11, 2017, 08 pages of ISRWO.

Plasencia, et al., "MisTable: Reach-Through Personal Screens for Tabletops", In Proceedings of ACM CHI 2014 Conference on Human Factors in Computing Systems, Apr. 26-May 1, 2014, 10 pages.

\* cited by examiner

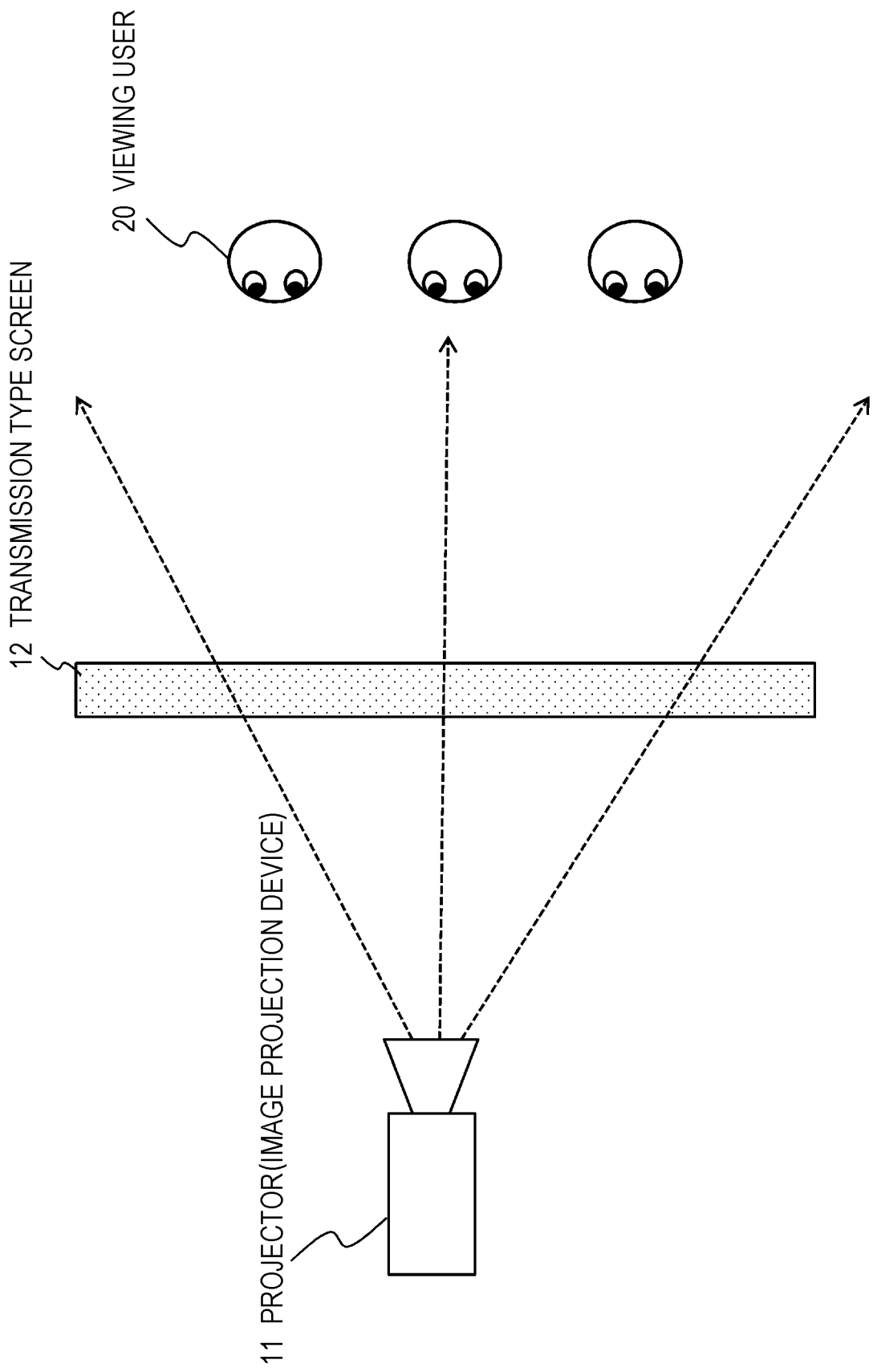

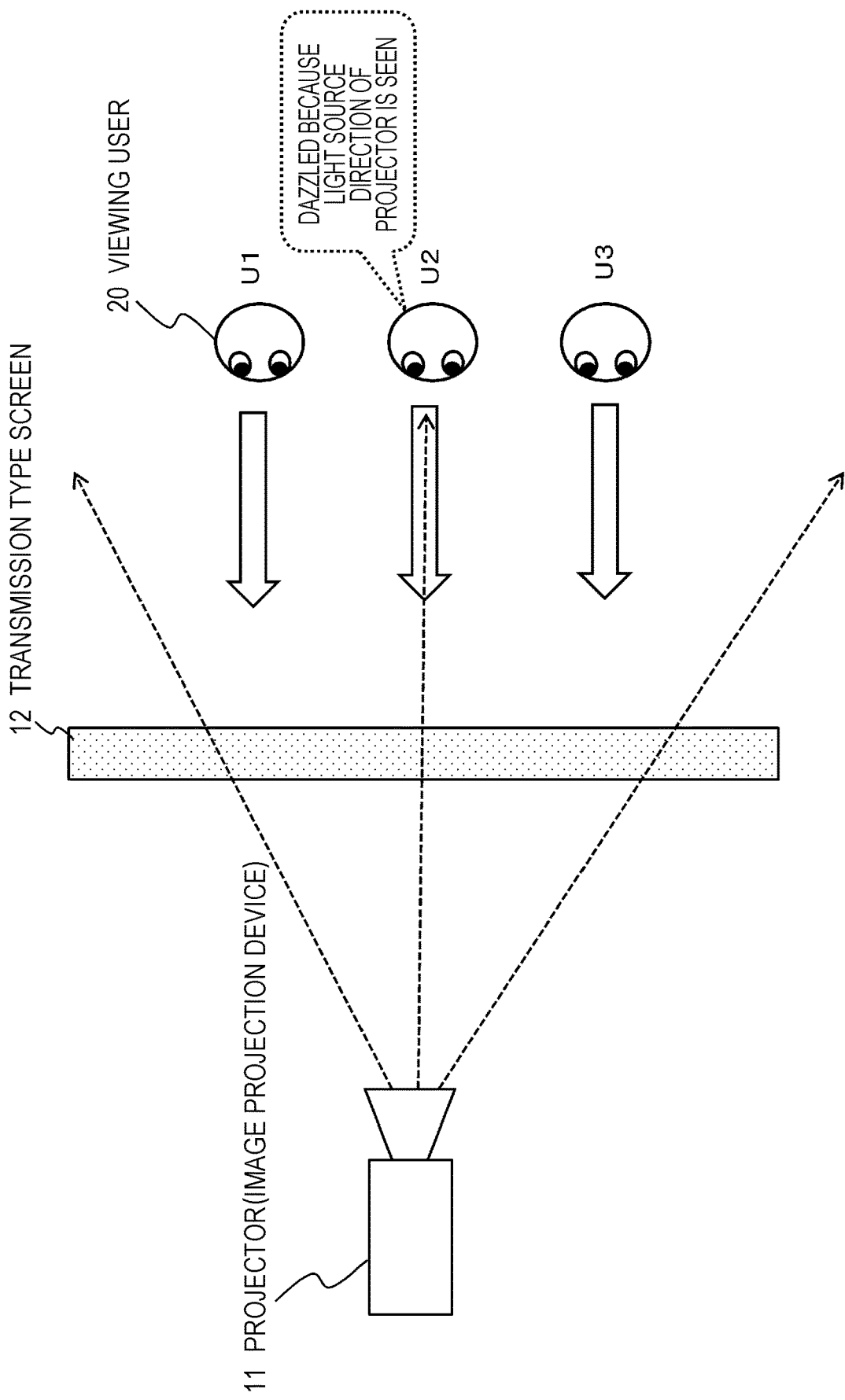

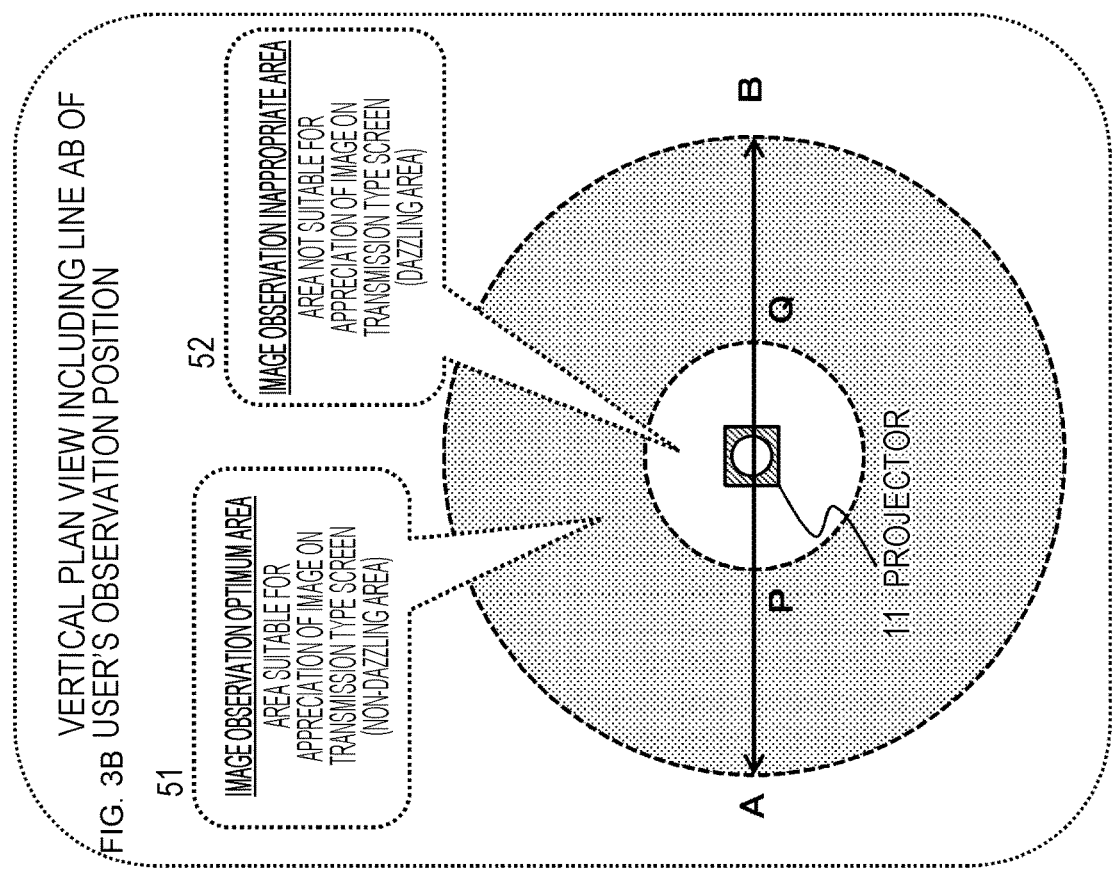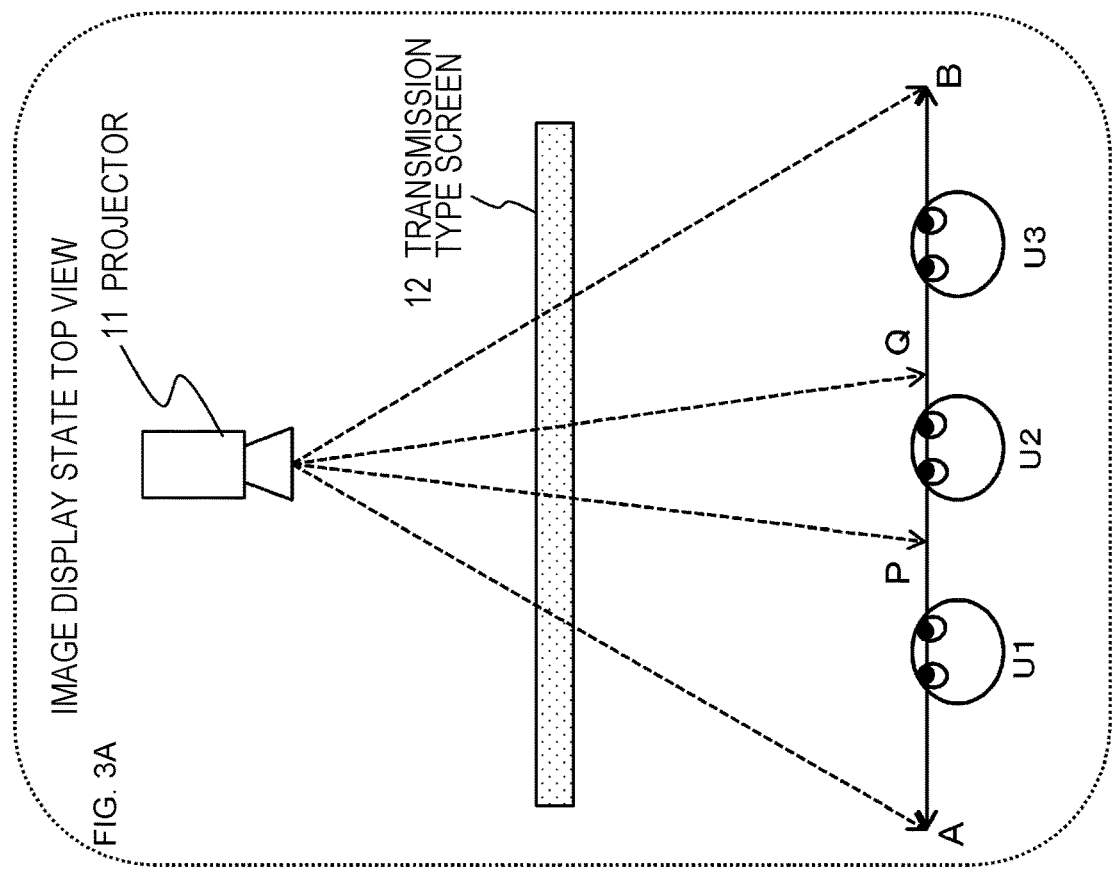

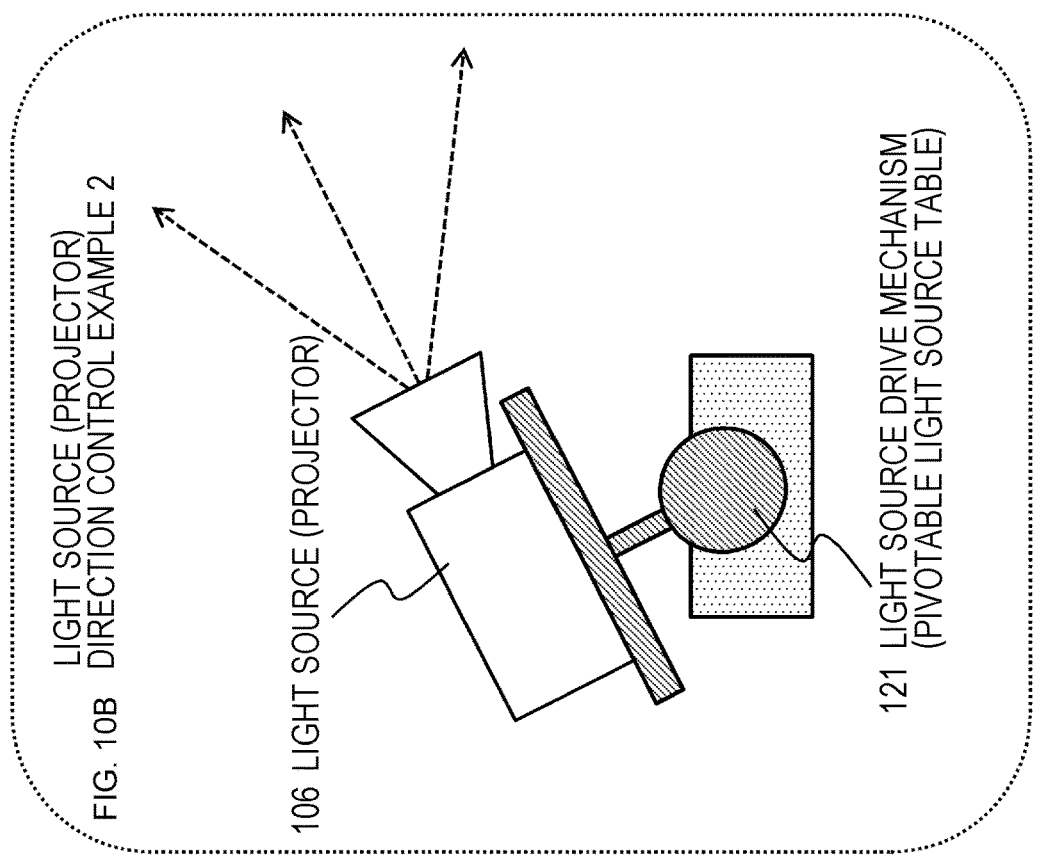
FIG. 10B LIGHT SOURCE (PROJECTOR) DIRECTION CONTROL EXAMPLE 2
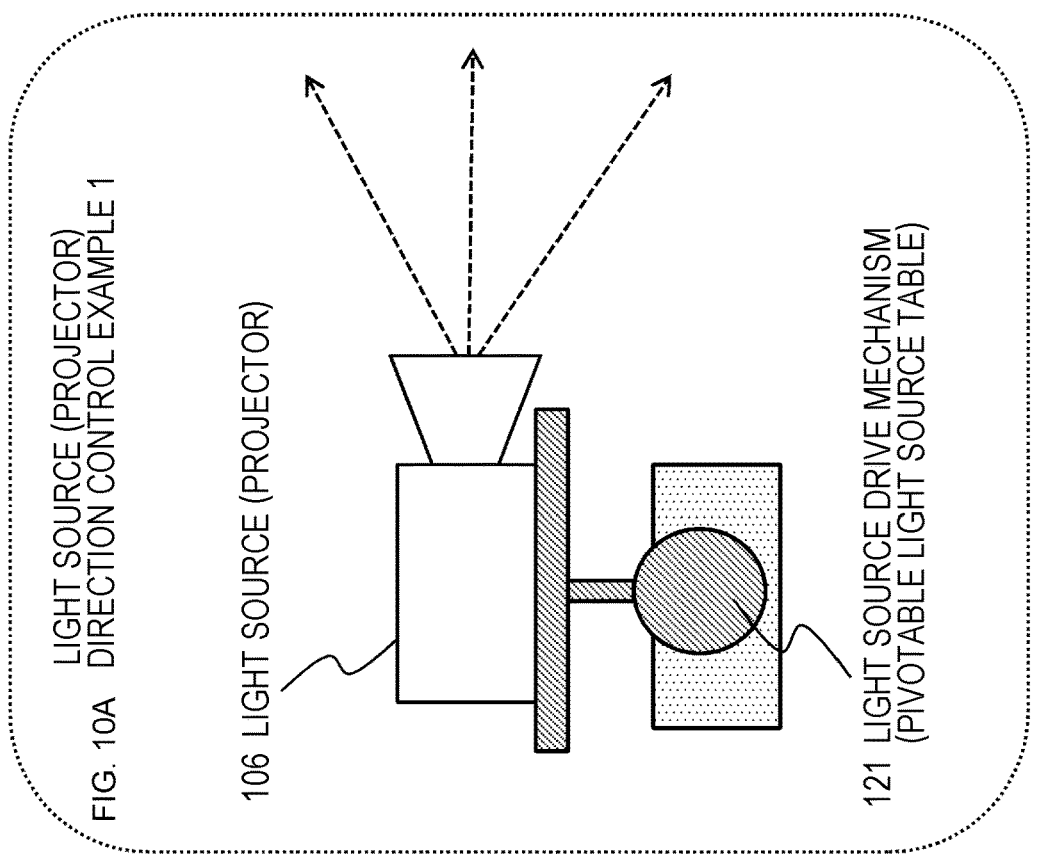
FIG. 10A LIGHT SOURCE (PROJECTOR) DIRECTION CONTROL EXAMPLE 1

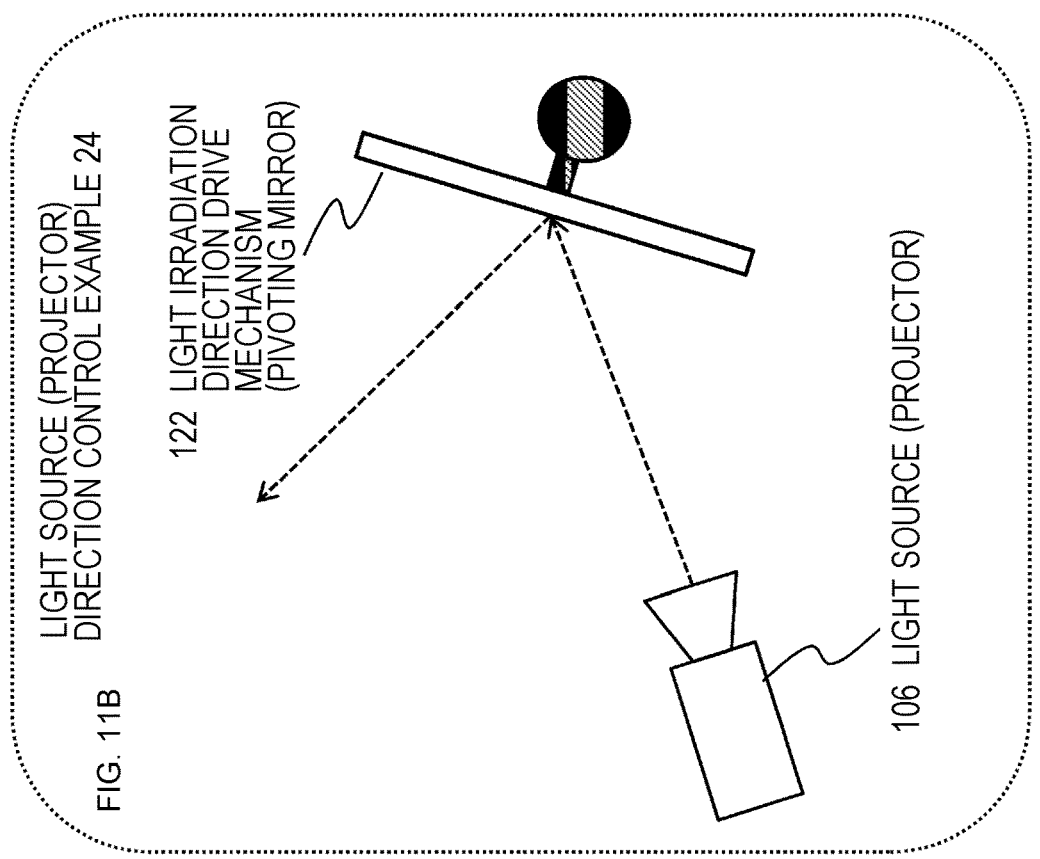
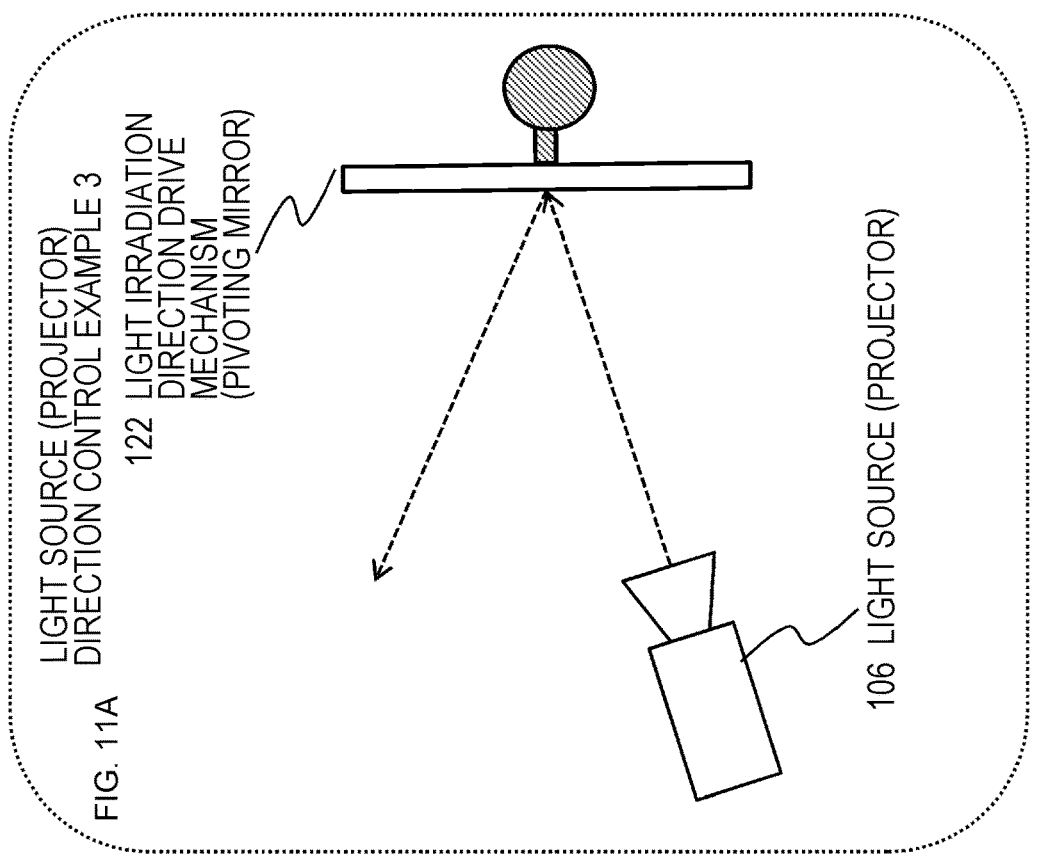

IMAGE DISPLAY CONTROL DEVICE AND IMAGE DISPLAY CONTROL METHOD

CROSS REFERENCE TO RELATED APPLICATIONS

This application is a U.S. National Phase of International Patent Application No. PCT/JP2017/000780 filed on Jan. 12, 2017, which claims priority benefit of Japanese Patent Application No. JP 2016-039831 filed in the Japan Patent Office on Mar. 2, 2016. Each of the above-referenced applications is hereby incorporated herein by reference in its entirety.

TECHNICAL FIELD

The present disclosure relates to an image display control device, an image display control method, and a program. More particularly, the present disclosure relates to an image display control device, an image display control method, and a program that execute image display on a transmission type screen.

BACKGROUND ART

For example, there is a display system that emits irradiation light from a light source such as a projector to a transmission type screen including a material that transmits light such as a transparent film or glass of a show window of a shop, fog, water vapor, or water droplets, and enables a viewing user on the opposite side to the light source with respect to the screen to appreciate a picture reflected on the screen.

The transmission type screen has a configuration that scatters the light emitted from the projector. The irradiation light constituting an image output by the projector is scattered in the transmission type screen including glass, water droplets or the like.

A user entering in the opposite side to the projector with respect to the screen can observe the output image of the projector as an image formed by scattered light on the screen.

Documents disclosing a display system using such a transmission type screen include the following documents, for example.

Non-Patent Document 1: (Diego Martinez Plasencia, Edward Joyce, and Sriram Subramanian. MisTable: Reach-through Personal Screens for Tabletops. Proceeding of ACM CHI, ACM, 2014.), Non-Patent Document 2: (DiVerdi, Stephen, Ismo Rakkolainen, Tobias Hollerer, and Alex Olwal. A novel Walk-through 3D Display.Proc.SPIE Electronic Imaging, SPIE, 2006.)

Patent Document 1: U.S. Pat. No. 5,270,752

These documents each disclose a system that project an image on a screen (FogScreen) using water droplets or water vapor.

However, in the image display system to which this transmission type screen is applied, the screen is arranged in front of the light source such as the projector, and further, the viewing user is positioned in front of the screen.

In such an arrangement, when the viewing user sees the transmission type screen, the viewing user may directly see the irradiation light of the light source ahead of the screen.

In such a situation, the viewing user is dazzled by the irradiation light of the light source (projector), and cannot observe the image on the screen normally.

Although there are indications that "dazzle" is a problem in the image display system using the transmission type screen in the non-patent documents and patent document, a specific means to solve "dazzle" has not been fully described.

CITATION LIST

Patent Document

Patent Document 1 U.S. Pat. No. 5,270,752

Non-Patent Document

Non-Patent Document 1: Diego Martinez Plasencia, Edward Joyce, and Sriram Subramanian. MisTable: Reach-through Personal Screens for Tabletops. Proceeding of ACM CHI, ACM, 2014.

Non-Patent Document 2: DiVerdi, Stephen, Ismo Rakkolainen, Tobias Hollerer, and Alex Olwal. A novel Walk-through 3D Display.Proc.SPIE Electronic Imaging, SPIE, 2006.

SUMMARY OF THE INVENTION

Problems to be Solved by the Invention

The present disclosure has been made in view of the above-described problem, for example, and an object of the present disclosure is to provide an image display control device, an image display control method, and a program that enable a user observing an image on a transmission type screen in an image display system to which the transmission type screen is applied, to observe the image in an optimal environment without directly seeing irradiation light of a light source such as a projector.

Solutions to Problems

A first aspect of the present disclosure is in an image display control device including:

a light source that executes image output to a transmission type screen;

the transmission type screen that receives irradiation light from the light source;

a control unit that controls at least one of the light source or the transmission type screen; and a control parameter calculation unit that calculates a control parameter defining a control mode of the control unit, in which the control parameter calculation unit sets, as input information, position information of a viewing user observing an image on the transmission type screen, and setting information of at least one of the light source or the transmission type screen, and on the basis of the input information, applies a discomfort index value calculation function that calculates a discomfort index value of image observation by the viewing user, to calculate a control parameter that minimizes a value of the discomfort index value calculation function, and outputs the control parameter to the control unit, and the control unit executes control based on the control parameter.

Further, a second aspect of the present disclosure is in an image display control method including executing image display control in an image display control device, in which the image display control device includes:

a light source that executes image output to a transmission type screen;

the transmission type screen that receives irradiation light from the light source;

a control unit that controls at least one of the light source or the transmission type screen; and a control parameter calculation unit that calculates a control parameter defining a control mode of the control unit, in which the control parameter calculation unit sets, as input information, position information of a viewing user observing an image on the transmission type screen, and setting information of at least one of the light source or the transmission type screen, and on the basis of the input information, applies a discomfort index value calculation function that calculates a discomfort index value of image observation by the viewing user, to calculate a control parameter that minimizes a value of the discomfort index value calculation function, and outputs the control parameter to the control unit, and the control unit executes control based on the control parameter.

Further, a third aspect of the present disclosure is in, a program for causing an image display control device to execute image display control, the image display control device including:

a light source that executes image output to a transmission type screen;

the transmission type screen that receives irradiation light from the light source;

a control unit that controls at least one of the light source or the transmission type screen; and a control parameter calculation unit that calculates a control parameter defining a control mode of the control unit, the program causing the control parameter calculation unit to execute processing that sets, as input information, position information of a viewing user observing an image on the transmission type screen, and setting information of at least one of the light source or the transmission type screen, and on the basis of the input information, applies a discomfort index value calculation function that calculates a discomfort index value of image observation by the viewing user, to calculate a control parameter that minimizes a value of the discomfort index value calculation function, and outputs the control parameter to the control unit, and causing the control unit to execute control based on the control parameter.

Note that, the program of the present disclosure is, for example, a program that can be provided by a communication medium or a storage medium provided in a computer readable form to a computer system or an information processing device that can execute various program codes. By providing such a program in a computer readable form, processing is implemented according to the program on the computer system or the information processing device.

Still other objects, features and advantages of the present disclosure will become apparent from the detailed description based on embodiments of the present disclosure and attached drawings to be described later. Note that, in this specification, the term "system" refers to a logical group configuration of a plurality of devices, and is not limited to a system in which the devices of respective configurations are in the same housing.

Effects of the Invention

According to a configuration of an embodiment of the present disclosure, a configuration is implemented that performs control enabling comfortable observation of the display image on the transmission type screen.

Specifically, the configuration includes a light source that executes image output to a transmission type screen, the transmission type screen that receives irradiation light from the light source, a control unit that controls at least one of the light source or the transmission type screen, and a control parameter calculation unit that calculates a control parameter defining a control mode of the control unit. The control parameter calculation unit sets, as input information, position information of a viewing user observing an image on the transmission type screen, and setting information of at least one of the light source or the transmission type screen, and on the basis of the input information, applies a discomfort index value calculation function that calculates a discomfort index value of image observation by the viewing user, to calculate a control parameter that minimizes a value of the discomfort index value calculation function, and outputs the control parameter to the control unit, and the control unit executes control of the light source or the screen on the basis of the control parameter.

With this configuration, a configuration is implemented that performs control enabling comfortable observation of the display image on the transmission type screen.

Note that, the advantageous effects described in this specification are merely examples, and the advantageous effects of the present technology are not limited to them and may include additional effects.

BRIEF DESCRIPTION OF DRAWINGS

FIG. 1 is a diagram illustrating an example of an image display system using a transmission type screen.

FIG. 2 is a diagram illustrating a problem of the image display system using the transmission type screen.

FIGS. 3A and 3B are diagrams illustrating an area in which a viewing user can comfortably observe an image and an area in which the viewing user cannot comfortably observe the image, in the image display system using the transmission type screen.

FIGS. 10A and 10B are diagrams illustrating a control configuration example of a light source (projector).

FIGS. 11A and 11B are diagrams illustrating a control configuration example of the light source (projector).

MODE FOR CARRYING OUT THE INVENTION

Figure 4:
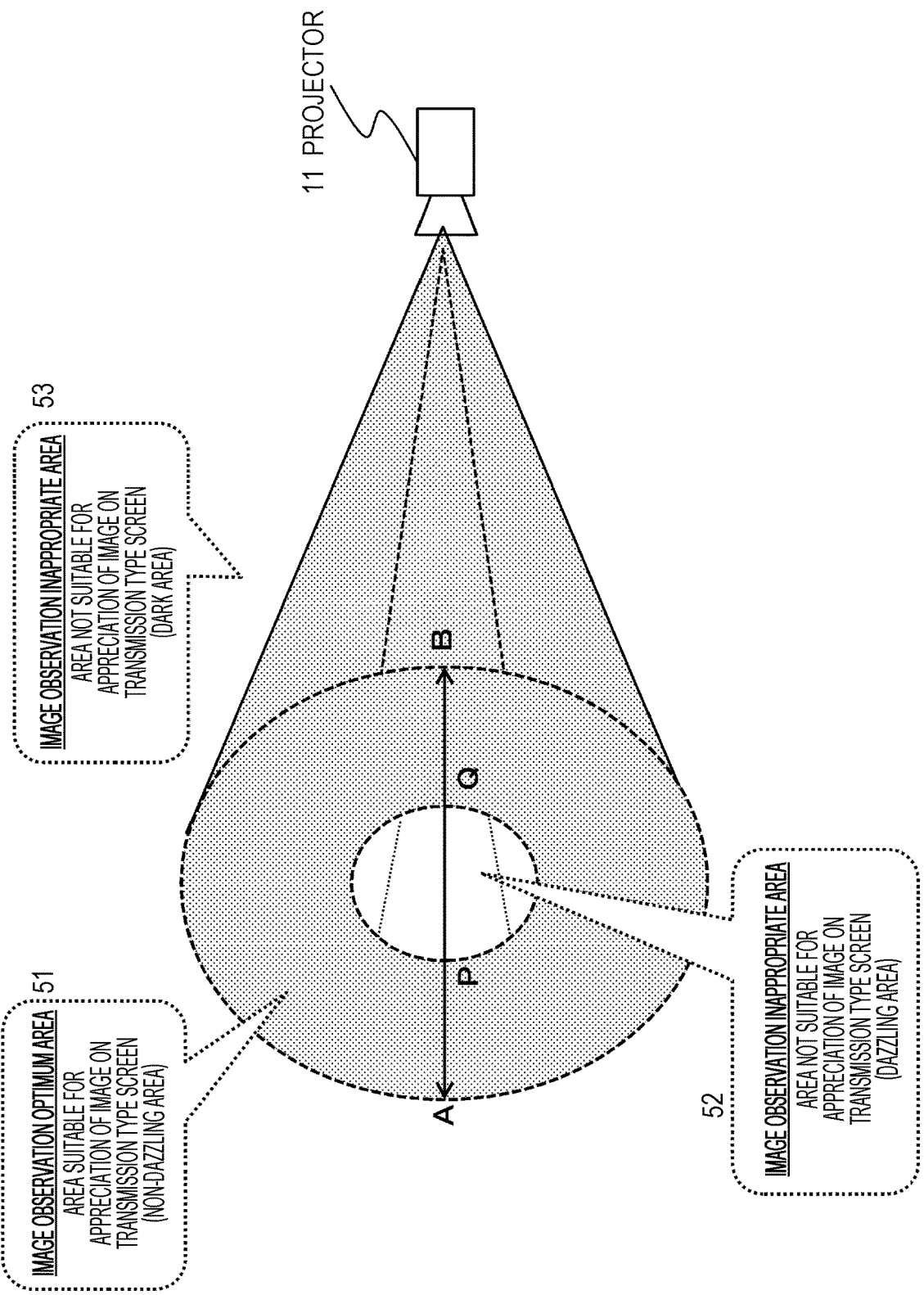
FIG. 4 is a diagram illustrating an area in which the viewing user can comfortably observe an image and an area in which the viewing user cannot comfortably observe the image, in the image display system using the transmission type screen.

Hereinafter, with reference to the drawings, details will be described of an image display control device, an image display control method, and a program of the present disclosure. Note that, the description will be made in accordance with the following items.

1. Outline and problems of image display system using transmission type screen
2. Image display control device enabling comfortable appreciation of display image of transmission type screen
3. (First embodiment) Configuration and processing of image display control device that executes control enabling comfortable observation of image on transmission type screen
4. Example configuration of light source control unit
5. Example configuration of screen control unit
6. Sequence of processing executed by image display control device
7. (Second embodiment) Embodiment in consideration of pixel value information of output image on screen
8. (Third embodiment) Embodiment in which pixel values of output image are controlled
9. Other embodiments
10. Example hardware configuration of information processing device
11. Summary of configuration of the present disclosure 1. Outline and Problems of Image Display System Using Transmission Type Screen First, an outline and problems will be described of an image display system using a transmission type screen.

FIG. 1 is a diagram illustrating an example of an image display system using a transmission type screen.

FIG. 1 illustrates a projector (image projecting device) 11, a transmission type screen 12, and a viewing user 20.

The projector (image projecting device) 11 is a projector that projects an image such as a movie on the transmission type screen 12, for example.

The transmission type screen 12 includes a member that transmits light, specifically, for example, glass, transparent plastic, transparent film, water droplets, water vapor, fog, or the like.

Screen material scatters light emitted from the projector 11, and the viewing user 20 observes the scattered light.

The viewing user 20 observes the transmission type screen 12 irradiated with emitted light of the projector 11.

The transmission type screen 12 includes a reflective material that scatters irradiation light of the projector 11, and the viewing user 20 can observe an irradiation image by the projector 11 by the scattered light of the transmission type screen 12.

However, in the image display system using the transmission type screen, as illustrated in FIG. 1, the projector 11 and the viewing user 20 are in positions facing each other with the transmission type screen 12 interposed therebetween.

That is, the viewing user 20 is positioned in an irradiation direction of the light emitted from the projector 11, and the viewing user 20 may directly see the projector 11 via the transmission type screen 12.

Problems in such an arrangement will be described with reference to FIG. 2.

As illustrated in FIG. 2, when the viewing user 20 sees the transmission type screen 12, the irradiation light from the projector 11 ahead of the screen may enter the field of view of the user.

In particular, as for a user U2 in the center illustrated in FIG. 2, the projector 11 is installed in front of the user U2, and when the user U2 sees the transmission type screen 12 in the front, the projector 11 behind the screen 12 comes directly into the field of view.

In such a situation, the user is dazzled by the irradiation light of the projector, and cannot see the image on the screen normally.

On the other hand, as for the users U1 and U3 illustrated in FIG. 2, the projector 11 does not exist in a front direction. Therefore, these users U1 and U3 can comfortably observe the image on the transmission type screen 12 without letting the projector 11 enter the field of view when looking at the front direction.

However, if the sight direction is oriented toward the projector 11, the users U1 and U3 are also dazzled by the irradiation light of the projector, and cannot observe the image on the screen normally.

As described above, there are cases where the image on the transmission type screen 12 can be comfortably observed and cannot be observed, depending on the sight direction and the position of the user.

2. Image Display Control Device Enabling Comfortable Appreciation of Display Image of Transmission Type Screen Next, the image display control device will be described that solves the problems as described above and performs control for enabling comfortable appreciation of the display image of the transmission type screen.

Note that, specific control executed by the image display control device described below is, for example, control enabling the viewing user to observe the image on the transmission type screen without letting the light emitted from the projector directly enter the field of view.

FIG. 3A is a diagram similar to FIGS. 1 and 2, and is a top view of an execution state of image display processing using the transmission type screen.

FIG. 3B is a vertical plan view of a vertical plane cut out at a user's observation position.

As for the user U2 illustrated in FIG. 3A, the projector 11 is positioned in the front direction of the user U2. Therefore, the user U2 cannot comfortably observe the image on the transmission type screen 12 because the irradiation light of the projector 11 directly enters the field of view.

On the other hand, as for the users U1 and U3 illustrated in FIG. 3A, the projector 11 is not positioned in the front direction of the users U1 and U3, so that the users U1 and U3 can comfortably observe the image on the transmission type screen 12 without letting the irradiation light of the projector 11 directly enter the field of view.

Note that, in a section from P to Q illustrated in the figure, the irradiation light of the projector 11 directly enters the field of view of an observer, and a section from A to B is an observable area of the image on the transmission type screen 12.

In a line AB in FIG. 3A, sections from A to P and from Q to B are areas in which the irradiation light from the projector 11 does not directly enter the field of view and the image on the transmission type screen 12 can be comfortably observed, that is, "image observation optimum area" suitable for image observation.

On the other hand, in the line AB in FIG. 3A, the section from P to Q is an area in which the irradiation light of the projector 11 directly enters the field of view and the image on the transmission type screen 12 cannot be comfortably observed, that is, "image observation inappropriate area" not suitable for image observation.

The "image observation optimum area" and the "image observation inappropriate area" are, for example, circular in one vertical plane.

However, the shape of each of these areas changes to various shapes depending on the arrangement position, arrangement direction, and the like of the transmission type screen 12 with respect to the light irradiation direction of the projector 11.

FIG. 3B is a vertical plan view of a vertical plane cut out at a position (line AB) where user's viewpoints are aligned.

"Image observation inappropriate area 52" illustrated in the figure is a circular area centered on a light-emitting direction position of the projector 11 and having a diameter of a line PQ.

In addition, "image observation optimum area 51" is a donut-like area excluding the "image observation inappropriate area 52" having the diameter of the line PQ from a circle also centered on the light-emitting direction position of the projector 11 and having a diameter of the line AB.

Note that, in an area outside the donut-like "image observation optimum area 51", since a luminance level of the irradiation light of the projector 11 falls, the image of the transmission type screen 12 becomes dark and becomes the "image observation inappropriate area".

FIG. 4 is a diagram illustrating the "image observation optimum area 51", the "image observation inappropriate area 52", and the "image observation inappropriate area 53" from near to far side of the projector 11.

As illustrated in FIG. 4, the "image observation optimum area 51" has a hollow conical cone shape with the projector 11 as a vertex.

The image display control device of the present disclosure performs control of the projector and the transmission type screen so that the viewing user can observe the image of the transmission type screen 12 from the image observation optimum area 51.

3. (First Embodiment) Configuration and Processing of Image Display Control Device that Executes Control Enabling Comfortable Observation of Image on Transmission Type Screen Next, as a first embodiment of the image display control device of the present disclosure, a configuration and processing will be described of an image display control device that executes control enabling comfortable observation of the image on the transmission type screen.

Figure 5:
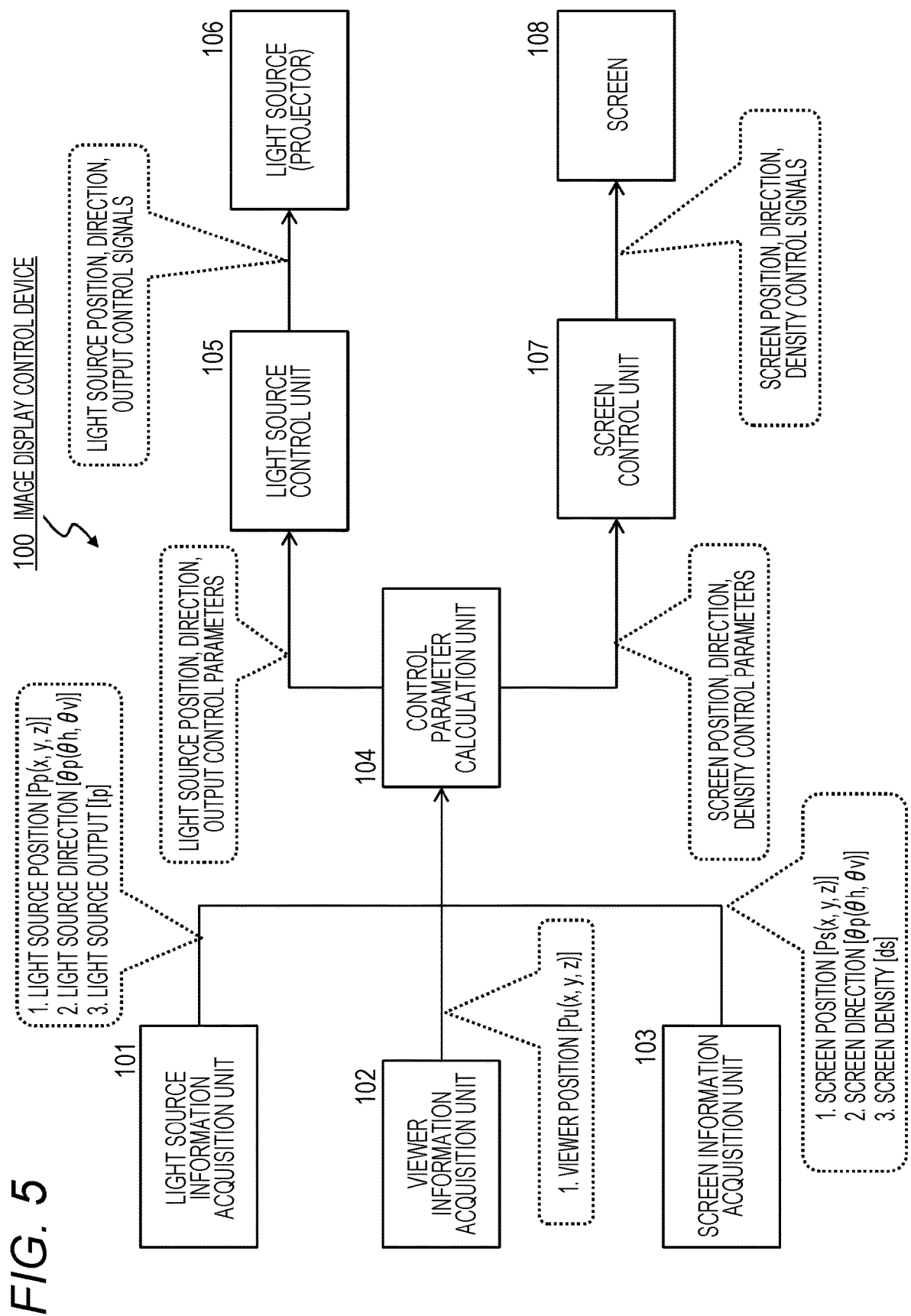
FIG. 5 is a diagram illustrating an example configuration of an image display control device of the present disclosure.

FIG. 5 illustrates an example configuration of an image display control device 100 of the first embodiment of the present disclosure.

As illustrated in FIG. 5, the image display control device 100 of the first embodiment of the present disclosure includes a light source information acquisition unit 101, a viewer information acquisition unit 102, a screen information acquisition unit 103, a control parameter calculation unit 104, a light source control unit 105, a light source (projector) 106, a screen control unit 107, and a screen 108.

The light source (projector) 106 is a light source such as a projector that projects an image such as a movie on the screen 108, for example.

Image data constituting content to be input from a content source such as a movie (not illustrated) is projected on the screen 108 of a transmission type.

The screen 108 is a transmission type screen and includes a material that transmits and scatters part of light, such as glass, plastic, film, or water droplets.

Note that, a screen may be used having a configuration enabled to control the scattering rate and transmittance by controlling a scattering member that is a constituent material of the screen 108.

For example, in a transmission type screen including water droplets generated by a sprayer, it is possible to control the scattering rate and transmittance of light by controlling the particle size and density of the water droplets.

In addition, also in the case of using a screen in which gas or liquid as a light scattering agent is filled inside the glass-like plate member, it is possible to control the scattering rate and transmittance of light by controlling the density of the filler.

The light source information acquisition unit 101 acquires a position (Pp) of the light source (projector) 106, a light irradiation direction ($\theta$p) of the light source, and an output intensity (Ip) of the light source.

The viewer information acquisition unit 102 acquires a position (Pu) of the viewing user.

The screen information acquisition unit 103 acquires a position (Ps) of the screen 108, a setting angle ($\theta$s) of the screen, and other screen setting information, for example, a density (ds) of a screen filling member (scattering material).

A specific example of each of these pieces of information will be described with reference to FIG. 6.

Figure 6:
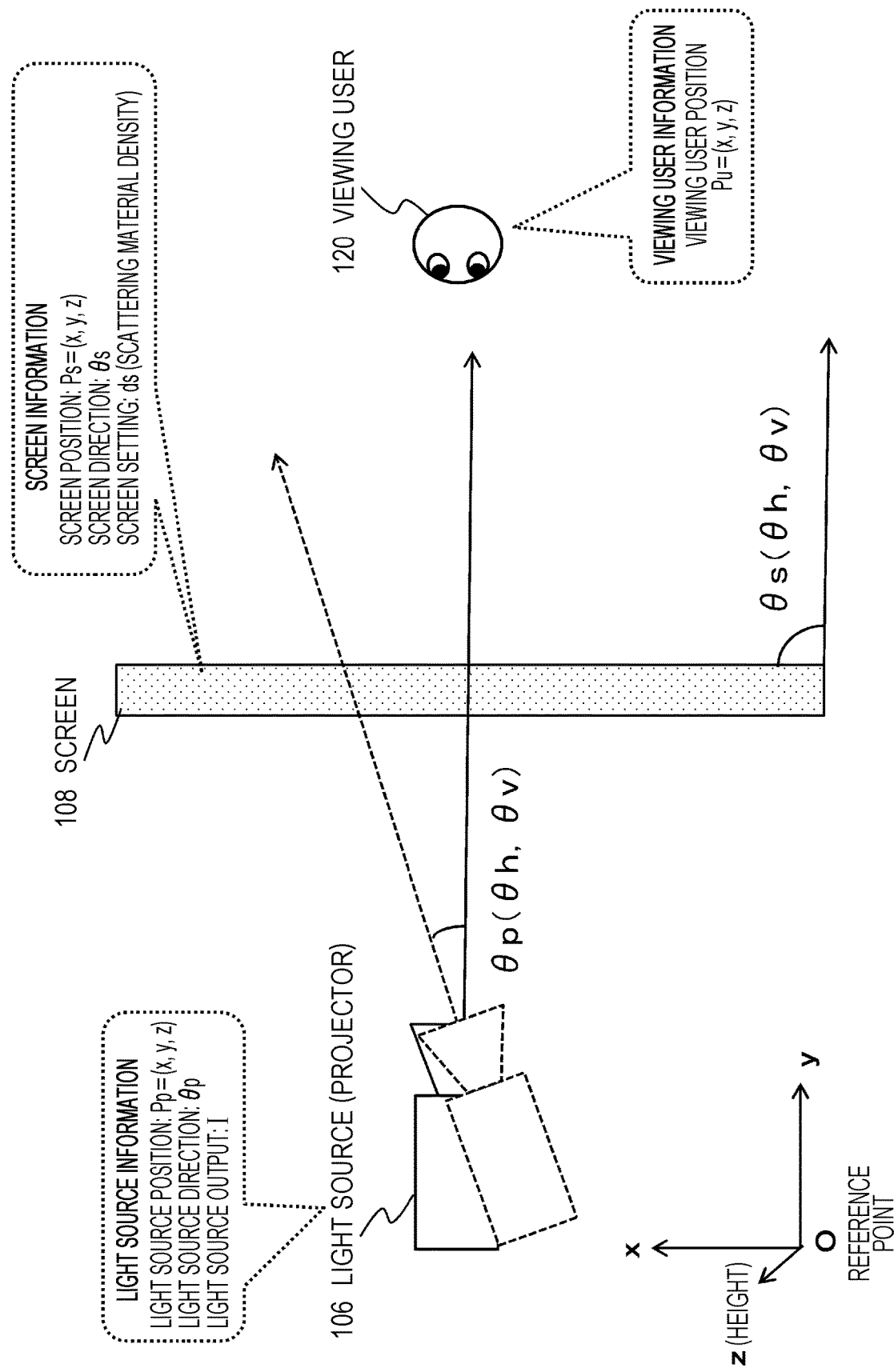
FIG. 6 is a diagram illustrating a specific example of information acquired by the image display control device of the present disclosure.

In FIG. 6, the light source (projector) 106, the screen 108, and a viewing user 120 are illustrated.

FIG. 6 is a diagram illustrating an xy plane when an image display environment is viewed from above, with the horizontal plane as the xy plane and the height direction as the z direction.

A three-dimensional space illustrated in FIG. 6 is defined as an xyz space having a predetermined reference point O as the origin.

Light source information acquired by the light source information acquisition unit 101 is the following information.

1. The position (Pp) of the light source (projector) 106: This position information (Pp) is, for example, coordinate information (x, y, z) in the three-dimensional space.

2. The light irradiation direction ($\theta$p) of the light source: This direction information includes, for example, an angle $\theta$h in the horizontal direction from the reference direction (for example, the y direction) of the xy plane corresponding to the horizontal plane, and an angle $\theta$v in the vertical direction from the reference direction (for example, the y direction) of the yz plane corresponding to the vertical plane.

3. The output intensity (Ip) of the light source: The output intensity (Ip) of the light source is, for example, luminance information of the light source.

The light source information acquired by the viewer information acquisition unit 102 is the following information.

1. The position (Pu) of the viewing user 120: This position information (Pu) is, for example, coordinate information (x, y, z) in the three-dimensional space.

The screen information acquired by the screen information acquisition unit 103 is the following information.

1. The position (Ps) of the screen 108: This position information (Ps) is, for example, coordinate information (x, y, z) of the three-dimensional space at the screen center.

2. The setting angle (θs) of the screen: This setting angle information includes, for example, an angle θh in the horizontal direction from the reference direction (for example, the y direction) of the xy plane corresponding to the horizontal plane, and an angle θv in the vertical direction from the reference direction (for example, the y direction) of the yz plane corresponding to the vertical plane.

3. Other screen setting information, for example, density (ds) of the screen filling member (scattering material).

Note that, various configurations are possible for acquisition configurations of the information in the light source information acquisition unit 101, the viewer information acquisition unit 102, and the screen information acquisition unit 103.

For example, various sensors can be used, such as a position sensor, a distance sensor (depth sensor), and an angle sensor. In addition, the image data captured by a camera may be analyzed to acquire necessary information.

In addition, as for the light source information acquired by the light source information acquisition unit 101, it is possible to store control information of the light source control unit 105 in a storage unit (memory) and use the accumulated information.

Also, as for the screen information acquired by the screen information acquisition unit 103, it is possible to store the control information of the screen control unit 107 in the storage unit (memory) and use the accumulated information.

As illustrated in FIG. 5, the light source information acquisition unit 101 acquires the position (Pp) of the light source (projector) 106, the light irradiation direction (θp) of the light source, and the output intensity (Ip) of the light source.

The viewer information acquisition unit 102 acquires the position (Pu) of the viewing user.

The screen information acquisition unit 103 acquires the position (Ps) of the screen 108, the setting angle (θs) of the screen, and other screen setting information, for example, the density (ds) of the screen filling member (scattering material).

The acquired information of each information acquisition unit is input to the control parameter calculation unit 104.

On the basis of the acquired information input from the light source information acquisition unit 101, the viewer information acquisition unit 102, and the screen information acquisition unit 103, the control parameter calculation unit 104 calculates control parameters defining a control mode for the light source 106 and control parameters defining a control mode for the screen 108.

As described above with reference to FIGS. 3A, 3B, and 4, the viewing user can comfortably observe the image on the transmission type screen when the viewing user is positioned in the image observation optimum area 51 illustrated in FIGS. 3A, 3B, and 4.

That is, it is necessary for the viewing user to be positioned in the image observation optimum area 51 in the hollow cone illustrated in FIG. 4.

The image observation optimum area 51 is an area in which control is possible of movement, deformation, or the like by changing the position or setting of the light source (projector) 106 or the screen 108.

The control parameter calculation unit 104 calculates the control parameters for control of the light source 106 and the screen 108 so that a current position of the viewing user is set in the image observation optimum area 51 depending on the current position of the viewing user.

Specific exemplary processing will be described executed by the control parameter calculation unit 104.

On the basis of the acquired information input from the light source information acquisition unit 101, the viewer information acquisition unit 102, and the screen information acquisition unit 103, the control parameter calculation unit 104 calculates a discomfort index value indicating a degree of user's discomfort.

The discomfort index value is calculated, for example, in accordance with a cost function C indicated in an (expression 1) below that is an example of a discomfort index value calculation function.

Cost function $C=C(Pu, Pp, \theta p)$ (expression 1)

The (expression 1) is an example of a cost function that calculates a user's discomfort index value on the basis of input information:
(1) the user position (Pu),
(2) the light source position (Pp), and
(3) the light irradiation direction (θp) of the light source.

Figure 7:
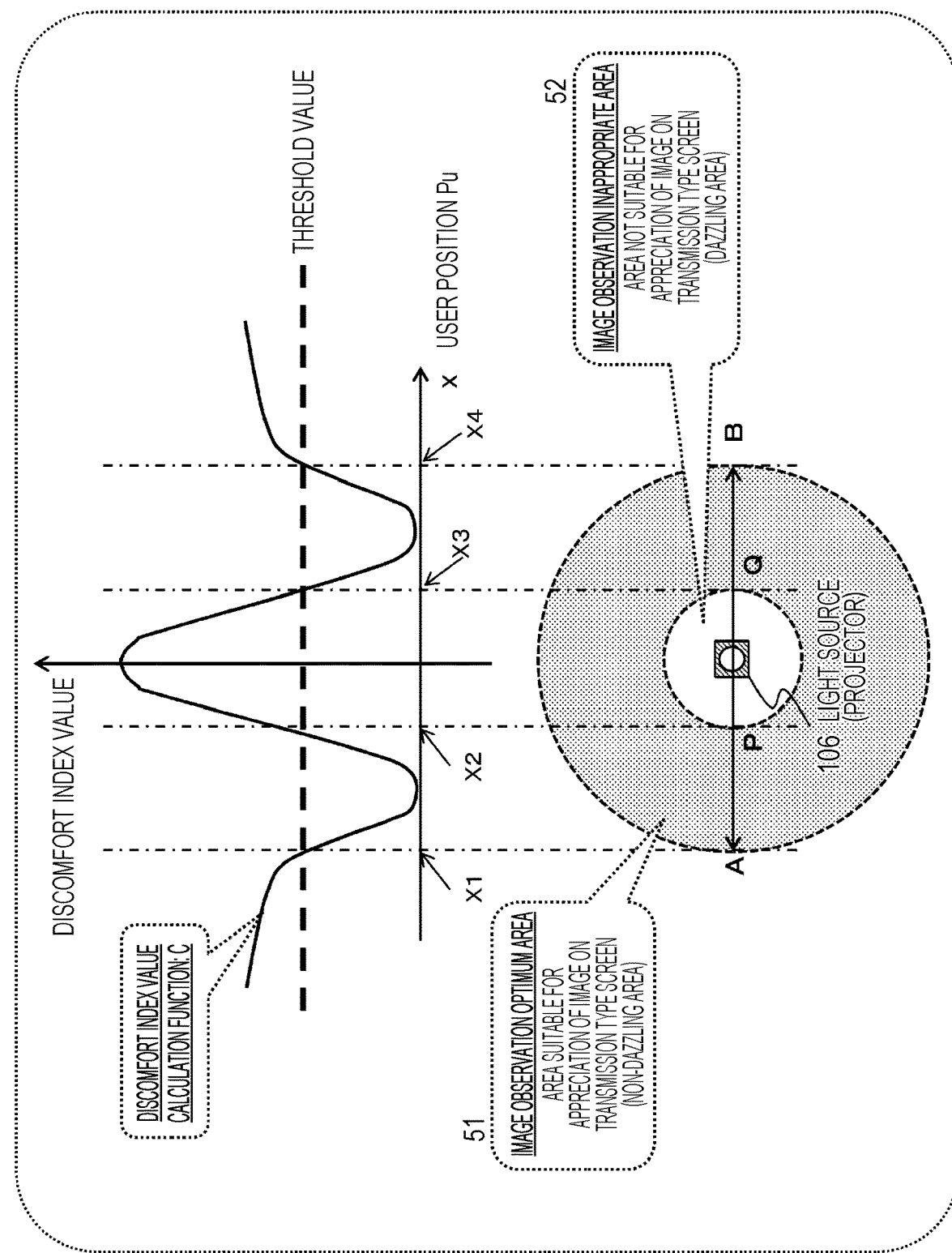
FIG. 7 is a diagram illustrating a discomfort index value calculation function (=cost function C).

For example, a discomfort index value calculation function (=cost function C) can be expressed as a curve illustrated in FIG. 7, the cost function C indicating a correspondence between the user position (Pu) and the discomfort index value when the light source position (Pp) and the light irradiation direction (θp) are fixed values.

In the graph illustrated in FIG. 7, the horizontal axis (X axis) is the user position (Pu) of the viewing user, and the vertical axis (Y axis) is the discomfort index value indicating the degree of user's discomfort.

The discomfort index value on the vertical axis indicates that, as the value increases, it is uncomfortable, and as the value decreases, it is comfortable, that is, it is a state in which the image can be observed in a satisfactory condition.

In the lower part of the graph, the image observation optimum area 51 and the image observation inappropriate area 52 are illustrated, which are described above with reference to FIGS. 3A and 3B.

These areas are indicated in correspondence with the (X axis) of the graph.

The user position of the viewing user, sections from X1 to X2 and from X3 to X4 of the graph, corresponds to the image observation optimum area 51 indicated in the lower part of the graph, that is, sections from A to P and from Q to B.

The sections from X1 to X2 and from X3 to X4 of the graph indicate that the discomfort index value is low, and it is a position in which the image on the screen can be comfortably observed.

On the other hand, for example, the section from X2 to X3 of the graph corresponds to the image observation inappropriate area 52 indicated in the lower part of the graph, that is, the section from P to Q. This section is an area in which the light source (projector) is positioned at a front position of the viewing user, and the viewing user is dazzled and cannot comfortably observe the image on the screen.

The section from X2 to X3 in the graph indicates that the discomfort index value is high, and it is a position in which the image on the screen cannot be comfortably observed.

As described above, the discomfort index value calculation function is a function having the minimum value in the image observation optimum area in which the viewing user can observe the image on the transmission type screen without letting the irradiation light of the light source directly enter the field of view. In addition, the discomfort index value calculation function is a function having a maximal value in the image observation inappropriate area in which the irradiation light of the light source directly enters the field of view when the viewing user observes the image on the transmission type screen.

On the basis of the acquired information input from the light source information acquisition unit 101, the viewer information acquisition unit 102, and the screen information acquisition unit 103, the control parameter calculation unit 104 applies the discomfort index value calculation function to calculate the discomfort index value indicating the degree of user's discomfort.

However, in fact, the user position (Pu) is not controllable, and adjustment is performed of the light source position (Pp) and the light irradiation direction (θp) of the light source.

Figure 8:
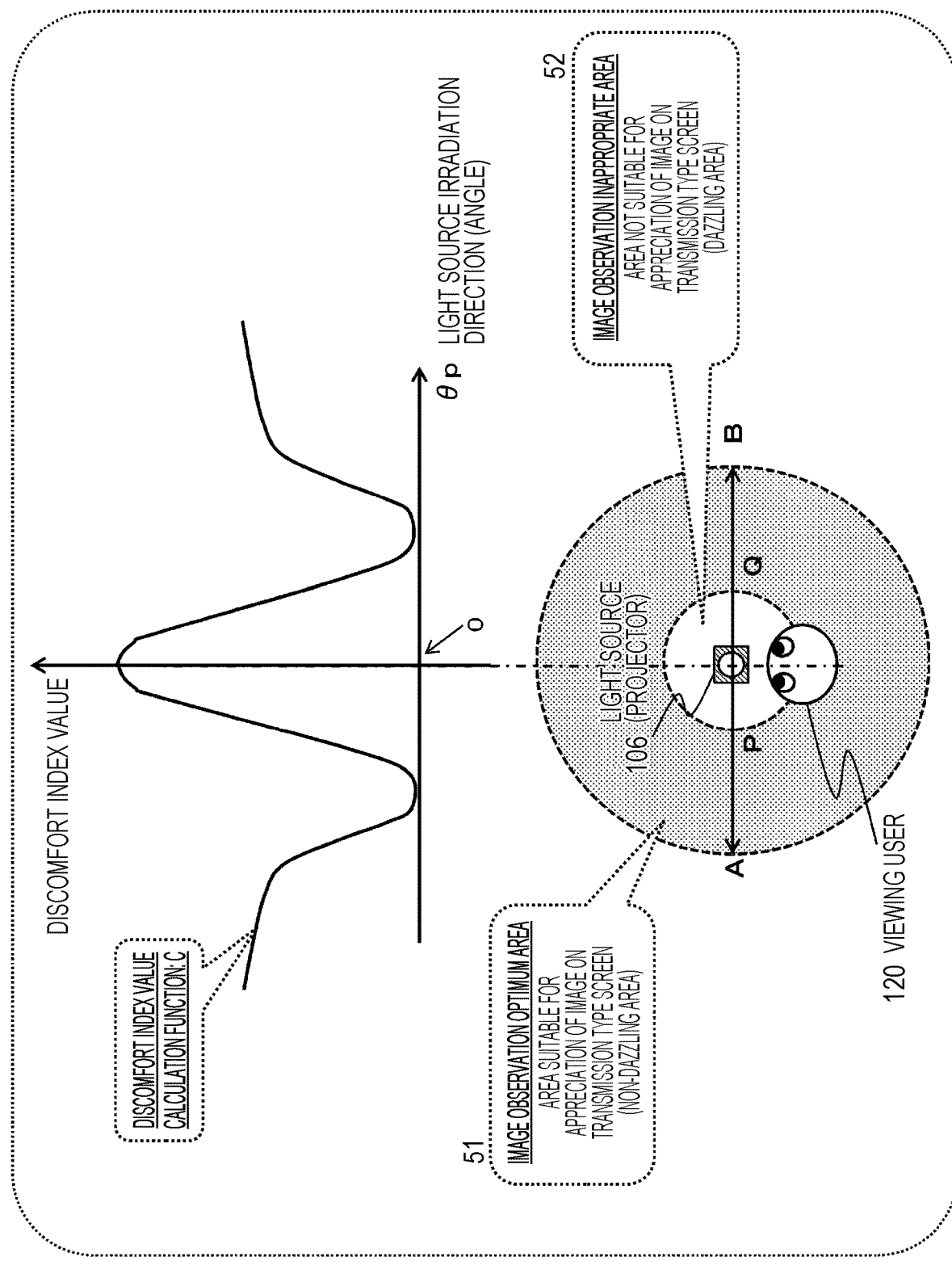
FIG. 8 is a diagram illustrating the discomfort index value calculation function (=cost function C).
Figure 9:
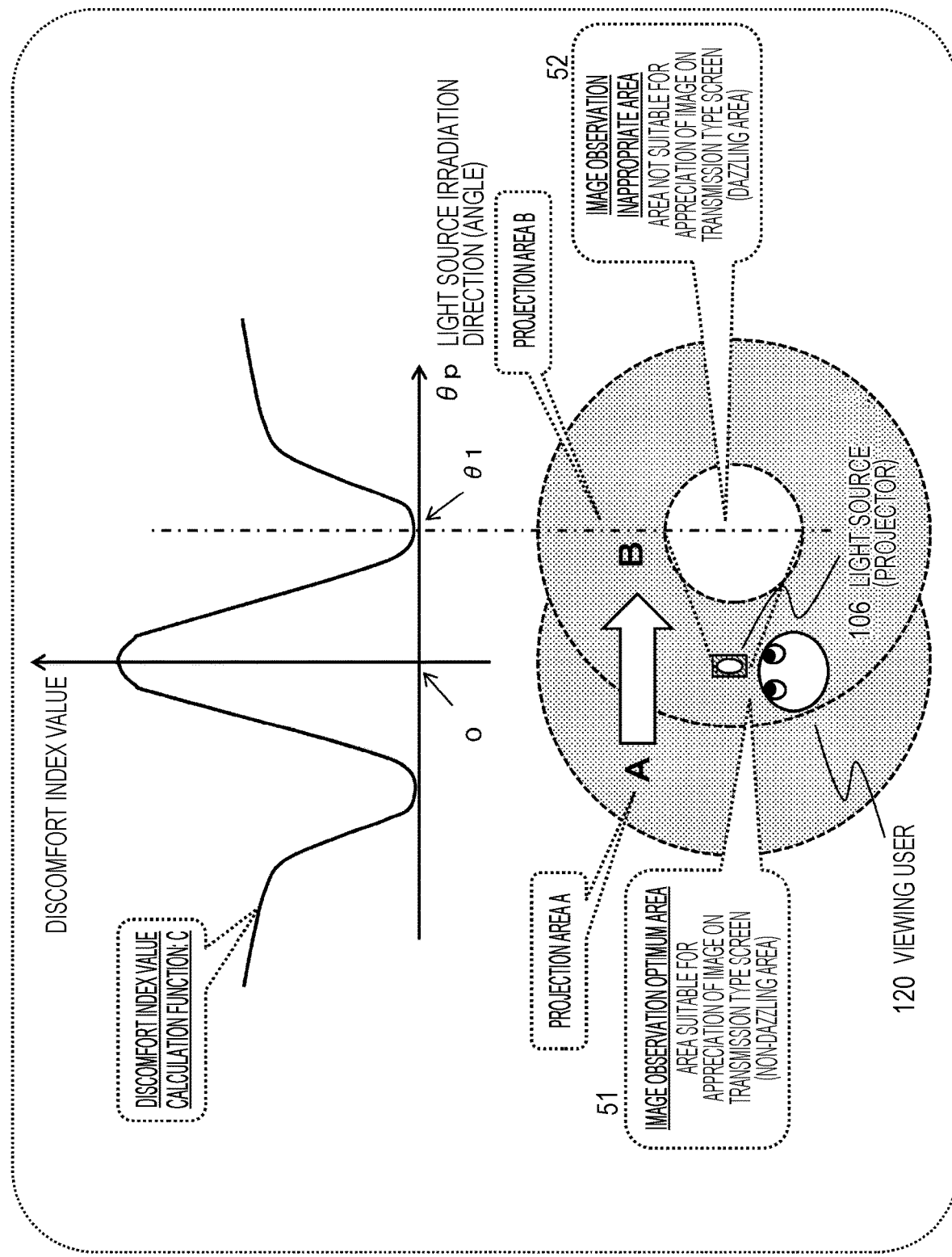
FIG. 9 is a diagram illustrating the discomfort index value calculation function (=cost function C).

FIGS. 8 and 9 each illustrate an example of the discomfort index value calculation function (=cost function C) indicating a correspondence between the discomfort index value and the light source irradiation direction (θp) in a case where the user position (Pu) and the light source position (Pp) are fixed values and the light source irradiation direction (θp) is variable.

In the graphs illustrated in FIGS. 8 and 9, the horizontal axis (X axis) is the light source irradiation direction (θp) of the light source (projector) 106, and the vertical axis (Y axis) is the discomfort index value indicating the degree of user's discomfort. The discomfort index value on the vertical axis indicates that, as the value increases, it is uncomfortable, and as the value decreases, it is comfortable, that is, it is a state in which the image can be observed in a satisfactory condition.

In the lower part of the graph, the image observation optimum area 51 and the image observation inappropriate area 52 are illustrated, which are described above with reference to FIGS. 3A and 3B.

These areas are indicated in correspondence with the (X axis) of the graph.

In the example illustrated in FIG. 8, the viewing user 120 enters in front of the light source (projector) 106.

In this state, the irradiation light of the light source (projector) 106 enters the field of view, and the viewing user 120 is dazzled and cannot comfortably observe the image on the screen 108.

This state corresponds to a state in which the light source irradiation direction (θp) of the light source (projector) 106 is 0°, and the discomfort index value indicated in the graph is a high value.

Here, the light source irradiation direction (θp) of the light source (projector) 106 is changed. FIG. 9 is a diagram for explaining an example in a case where the light source irradiation direction (θp) of the light source (projector) 106 is changed.

FIG. 9 illustrates an example in which the light source irradiation direction (θp) of the light source (projector) 106 is changed from 0° to θ1.

By this change control of the light source irradiation direction (θp), a projection area of the projector moves from a projection area A to a projection area B, as illustrated in the lower diagram of FIG. 9.

With this movement, the viewing user 120 can observe the image on the screen 108 in the image observation optimum area 51.

That is, it is possible to observe the image on the screen 108 in a comfortable state without letting the irradiation light of the light source (projector) 106 directly enter the field of view.

The discomfort index value of the graph corresponding to this state is a point of the light source irradiation direction (θp)=θ1.

In the light source irradiation direction (θp)=θ1, the discomfort index value is nearly the minimum value, and is an index value indicating that the viewing user 120 can comfortably observe the image.

In FIG. 9, to facilitate an understanding of the description, the control value is set only in the light source irradiation direction (θp), but an optimum viewing environment is constructed by combining various other controllable values.

The above-described (expression 1) is the following cost function.

$$\text{Cost function } C=C(Pu, Pp, \theta p) \qquad \text{(expression 1)}$$

This cost function calculates the user's discomfort index value by using the input information:
(1) the user position (Pu),
(2) the light source position (Pp), and
(3) the light irradiation direction (θp) of the light source.

In a case where the user position (Pu) is uncontrollable, the light source position (Pp) and the light irradiation direction (θp) of the light source are actually controllable.

The control parameter calculation unit 104 sets (1) the user position (Pu), (2) the light source position (Pp), (3) the light irradiation direction (θp), and a cost function that calculates the user's discomfort index value by using these pieces of input information, that is, a discomfort index value calculation function similar to that illustrated in FIGS. 7 to 9, and calculates the light irradiation direction (θp) of the light source and the light source position (Pp) that minimize a value of the discomfort index value calculation function.

The light source position and the light irradiation direction of the light source are controlled by using the calculated values, whereby the viewing user can comfortably observe the image on the screen.

Note that, the cost function (discomfort index value calculation function) using a plurality of parameters is a function having the minimum value in a state in which the viewing user 120 is set in the image observation optimum area similarly to cases illustrated in FIGS. 7 to 9.

The (expression 1) is an example of one cost function that calculates the discomfort indication value, and is a cost function that calculates the user's discomfort index value by using only the input information:
(1) the user position (Pu),
(2) the light source position (Pp), and
(3) the light irradiation direction (θp) of the light source.

Further, an example will be described of a cost function using other input information.

A discomfort index value calculation function (=cost function C) indicated in an (expression 2) below is a cost function C that calculates the viewing user's discomfort index value by adding the light intensity (Ip) of the light source 106 in addition to the input information used in the (expression 1).

$$\text{Cost function } C=C(Pu,Pp,\theta p,Ip) \quad \text{(expression 2)}$$

The (expression 2) is a cost function that calculates the user's discomfort index value on the basis of input information below.
(1) the user position (Pu),
(2) the light source position (Pp),
(3) the light irradiation direction (θp) of the light source,
(4) the irradiation light intensity (Ip) of light source Further, a discomfort index value calculation function (=cost function C) indicated in an (expression 3) below is a cost function C that calculates the viewing user's discomfort index value by adding screen information in addition to the input information used in the (expression 2).

$$\text{Cost function } C=C(Pu,Pp,\theta p,Ip,Ps,\theta s,ds) \quad \text{(expression 3)}$$

The (expression 3) is a cost function that calculates the user's discomfort index value on the basis of input information below.
(1) the user position (Pu),
(2) the light source position (Pp),
(3) the light irradiation direction (θp) of the light source,
(4) the irradiation light intensity (Ip) of light source
(5) the screen position (Ps),
(6) the setting angle (θs) of the screen,
(7) the packing density (ds) of the light scattering material of the screen The control parameter calculation unit 104 applies any one of the discomfort index value calculation functions (=cost functions C) indicated by the (expression 1) to (expression 3) to calculate values of parameters that minimizes a calculated value of the applied function (=discomfort index value).

Note that, the cost functions (discomfort index value calculation functions) using the plurality of parameters are functions each having the minimum value in a state in which the viewing user 120 is set in the image observation optimum area similarly to the case of the discomfort index value calculation function illustrated and described in FIGS. 7 to 9.

Hereinafter, as an example, exemplary processing will be described in a case where the control parameter calculation unit 104 applies the cost function (the discomfort index value calculation function) indicated in the (expression 3) to calculate the control parameters.

The control parameter calculation unit 104 obtains parameters that minimize the user's discomfort index value calculated by the (expression 3) in accordance with an (expression 4) below.

$$\text{argmin}_{Pp,\theta p,Ip,Ps,\theta s,ds}C(Pu,Pp,\theta p,Ip,Ps,\theta s,ds) \quad \text{(expression 4)}$$

Note that, the arithmetic expression indicated in the (expression 4) is an arithmetic expression that calculates parameters Pu, Pp, θp, Ip, Ps, θs, ds that minimize a value of the cost function C (expression 3) described above, that is, $$\text{Cost function } C=C(Pu,Pp,\theta p,Ip,Ps,\theta s,ds).$$

Note that, the control parameters calculated in accordance with the (expression 4) are
the control parameters of the light source and the control parameters of the screen, and are the following parameters.
(1) the light source position (Pp),
(2) the light irradiation direction (θp) of the light source,
(3) the irradiation light intensity (Ip) of the light source
(4) the screen position (Ps),
(5) the setting angle (θs) of the screen,
(6) the packing density (ds) of the light scattering material of the screen The control parameter calculation unit 104 outputs the control parameters calculated in accordance with the (expression 4) to the light source control unit 105 and the screen control unit 107.

The control parameter calculation unit 104 outputs the following control parameters to the light source control unit 105
(1) the light source position (Pp),
(2) the light irradiation direction (θp) of the light source,
(3) the irradiation light intensity (Ip) of the light source Further, the control parameter calculation unit 104 outputs the following control parameters to the screen control unit 107
(4) the screen position (Ps),
(5) the setting angle (θs) of the screen,
(6) the packing density (ds) of the light scattering material of the screen The light source control unit 105 controls the light source 106 in accordance with the control parameters (the light source position (Pp), the light irradiation direction of the light source, the irradiation light intensity (Ip) of the light source) input.

In addition, the screen control unit 107 also controls the screen 108 in accordance with the control parameters (the screen position (Ps), the setting angle (θs) of the screen, the packing density (ds) of the light scattering material of the screen) input.

Note that, here, an example has been described in which control is performed by using all the following six types of control parameters, that is,
(1) the light source position (Pp),
(2) the light irradiation direction (θp) of the light source,
(3) the irradiation light intensity (Ip) of light source,
(4) the screen position (Ps),
(5) the setting angle (θs) of the screen, and
(6) the packing density (ds) of the light scattering material of the screen;
however, the control may be performed by using only a part of these control parameters.

For example, a cost function using less control parameters, such as the above-described (expression 1), (expression 2), or the like, may be applied to calculate control parameters that minimize a value of each cost function, and the control may be executed by using the calculated control parameters.

In each case, parameters are obtained that minimize a value of each cost function C, and at least one of the light source (projector) 106 or the screen 108 is controlled in accordance with the control parameters.

By this control, control is implemented such that the cost function has the minimum value, that is, the discomfort index value calculation function described with reference to FIGS. 7 to 9, has the minimum value. As a result, the viewing user can comfortably observe the image on the screen 108 in the image observation optimum area 51 described with reference to FIGS. 7 to 9 and others.

4. Example Configuration of Light Source Control Unit

Next, an example configuration will be described of the light source control unit 105.

The light source control unit 106 controls the light source 106 in accordance with the control parameters (the light source position (Pp), the light irradiation direction of the light source, the irradiation light intensity (Ip) of the light source) input from the control parameter calculation unit 104.

The light source control unit 105, for example, includes a mechanism that horizontally and vertically moves and further causes the light source 106 to pivot, and further includes a control unit that controls the irradiation light intensity.

Specifically, for example, a light source fixing unit to which the light source 106 is fixed is moved in the horizontal and vertical directions, and rotationally driven, by a motor.

A light source direction control configuration example will be described with reference to FIGS. 10A and 10B.

FIGS. 10A and 10B illustrate an example configuration for control of the light source direction.

The light source 106 is fixed to a light source drive mechanism 121. The light source drive mechanism 121 is pivotable as illustrated in FIGS. 10A and 10B, and it is possible to change the light irradiation direction of the light source 106.

Further, FIGS. 11A and 11B illustrate another light source direction control configuration example. The example illustrated in FIGS. 11A and 11B is an example using a light irradiation direction control mechanism 122 including a pivoting mirror for the irradiation light from the light source 106.

The light irradiation direction control mechanism 122 including the pivoting mirror is pivotable as illustrated in FIGS. 11A and 11B, and it is possible to change the light irradiation direction of the light source 106.

Note that, the light source drive mechanisms illustrated in FIGS. 10A 10B, 11A, and 11B illustrate representative example configurations, and various other configurations are possible.

5. Example Configuration of Screen Control Unit

Next, an example configuration will be described of the screen control unit 106.

The screen control unit 107 controls the screen 108 in accordance with the control parameters (the screen position (Ps), the setting angle ($\theta$s) of the screen, the packing density (ds) of the light scattering material of the screen) input from the control parameter calculation unit 104.

The screen control unit 107, for example, includes a mechanism that horizontally and vertically moves and further causes the screen 108 to pivot, and further includes a control unit that controls the packing density (ds) of the light scattering material of the screen.

Specifically, for example, a screen fixing unit to which the screen 108 is fixed is moved in the horizontal and vertical directions, and rotationally driven, by a motor.

In addition, the control of the packing density (ds) of the light scattering material of the screen is performed, for example, as follows.

For example, in a transmission type screen including water droplets generated by a sprayer, it is possible to control the ejection amount, particle size, density, and the like of water droplets, and by controlling them, it is possible to control the scattering rate and transmittance of light.

The control of the packing density (ds) of the light scattering material of the screen is executed by controlling the ejection amount, the particle size, and the density of water droplets.

In addition, in the case of using a screen in which gas or liquid as a light scattering agent is filled inside the glass-like plate member, the density of the filler is directly controlled.

By the above processing, it is possible to control the scattering rate and transmittance of light of the screen 108.

6. Sequence of Processing Executed by Image Display Control Device

Next, a sequence will be described of processing executed by the image display control device 100 of the first embodiment illustrated in FIG. 5 with reference to the flowchart illustrated in FIG. 12.

Figure 12:
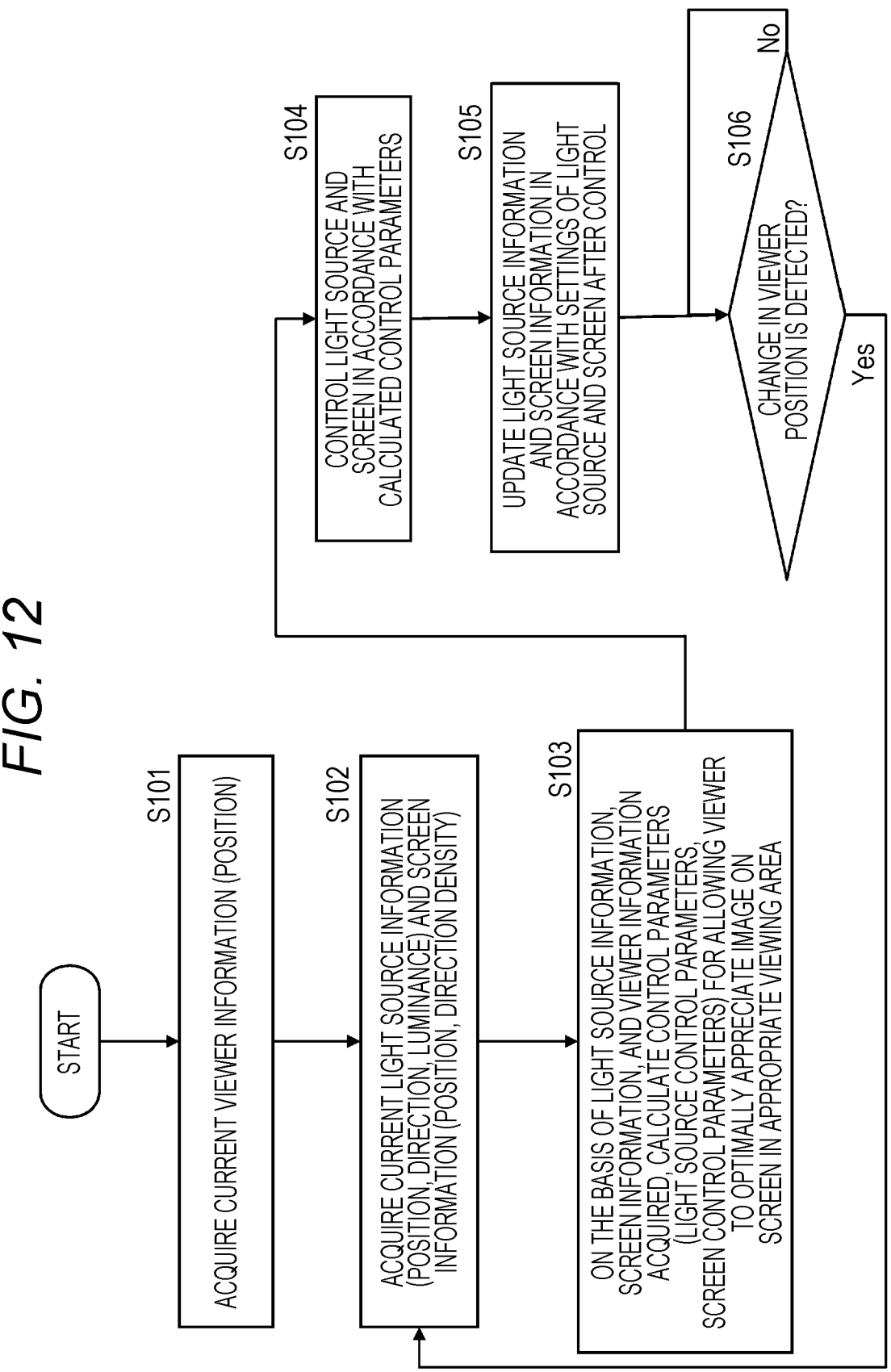
FIG. 12 is a flowchart illustrating a sequence of processing executed by the image display control device of the present disclosure.

Although not illustrated in FIG. 5, for example, the processing according to the flowchart illustrated in FIG. 12 can be executed under control of a control unit (data processing unit) including a CPU having a program execution function, and the like, in accordance with a program stored in a storage unit of the image display control device.

Hereinafter, the processing will be sequentially described of each step of the flowchart illustrated in FIG. 12.

(Steps S101 and S102)

First, in step S101, current viewer information (position) is acquired.

Next, in step S102, current light source information (position, direction, luminance) and screen information (position, direction, density) are acquired.

These processing steps are executed by the light source information acquisition unit 101, the viewer information acquisition unit 102, and the screen information acquisition unit 103 illustrated in FIG. 5.

The light source information acquisition unit 101 acquires the position (Pp) of the light source (projector) 106, the light irradiation direction ($\theta$p) of the light source, and the output intensity (Ip) of the light source.

The viewer information acquisition unit 102 acquires the position (Pu) of the viewing user.

The screen information acquisition unit 103 acquires the position (Ps) of the screen 108, the setting angle ($\theta$s) of the screen, and other screen setting information, for example, the density (ds) of the screen filling member (scattering material).

The specific example of each of these pieces of information is as described above with reference to FIG. 6.

That is, the light source information acquired by the light source information acquisition unit 101 is the following information.

1. The position (Pp) of the light source (projector) 106: This position information (Pp) is, for example, coordinate information (x, y, z) in the three-dimensional space.

2. The light irradiation direction ($\theta$p) of the light source: This direction information includes, for example, an angle $\theta$h in the horizontal direction from the reference direction (for example, the y direction) of the xy plane corresponding to the horizontal plane, and an angle $\theta$v in the vertical direction from the reference direction (for example, the y direction) of the yz plane corresponding to the vertical plane.

3. The output intensity (Ip) of the light source: The output intensity (Ip) of the light source is, for example, luminance information of the light source.

The light source information acquired by the viewer information acquisition unit 102 is the following information.

1. The position (Pu) of the viewing user 120: This position information (Pu) is, for example, coordinate information (x, y, z) in the three-dimensional space.

The screen information acquired by the screen information acquisition unit 103 is the following information.

1. The position (Ps) of the screen 108: This position information (Ps) is, for example, coordinate information (x, y, z) in the three-dimensional space.

2. The setting angle (θs) of the screen: This setting angle information includes, for example, an angle θh in the horizontal direction from the reference direction (for example, the y direction) of the xy plane corresponding to the horizontal plane, and an angle θv in the vertical direction from the reference direction (for example, the y direction) of the yz plane corresponding to the vertical plane.

3. Other screen setting information, for example, density (ds) of the screen filling member (scattering material).

Note that, the information acquired in steps S101 and S102, that is, the viewer information (position), the light source information (position, direction, luminance), and the screen information (position, direction, density) are stored in the memory.

(Step S103)

Next, in step S103, on the basis of the acquired viewer information, light source information, and screen information, the control parameters (light source control parameters, screen control parameters) are calculated for allowing the viewer to optimally appreciate the image on the screen in the appropriate viewing area.

This processing is executed by the control parameter calculation unit 104 illustrated in FIG. 5.

On the basis of the acquired information input from the light source information acquisition unit 101, the viewer information acquisition unit 102, and the screen information acquisition unit 103, the control parameter calculation unit 104 calculates control parameters defining a control mode for the light source 106 and control parameters defining a control mode for the screen 108.

As described above with reference to FIGS. 7 to 9 and the like, for example, the cost function C (discomfort index value calculation function) indicated in the (expression 3), that is, $$\text{Cost Function } C = C(Pu, Pp, \theta p, Ip, Ps, \theta s, Ds) \quad \text{(expression 3)}$$

is applied, and the control parameters are calculated.

As described above, the control parameter calculation unit 104 obtains the parameters that minimize the user's discomfort index value calculated by the (expression 3) by the following (expression 4).

$$\text{argmin}_{Pp, \theta p, Ip, Ps, \theta s, ds} C(Pu, Pp, \theta p, Ip, Ps, \theta s, ds) \quad \text{(expression 4)}$$

The control parameters calculated in accordance with the (expression 4) are the control parameters of the light source and the control parameters of the screen, and are the following parameters.

(1) the light source position (Pp),
(2) the light irradiation direction (θp) of the light source,
(3) the irradiation light intensity (Ip) of the light source
(4) the screen position (Ps),
(5) the setting angle (θs) of the screen,
(6) the packing density (ds) of the light scattering material of the screen (Step S104)

Next, in step S104, the light source and the screen are controlled in accordance with the control parameters calculated in step S103.

This processing is executed by the light source control unit 105 and the screen control unit 107 illustrated in FIG. 5.

The light source control unit 105 controls the light source 106 in accordance with the control parameters (the light source position (Pp), the light irradiation direction of the light source, the irradiation light intensity (Ip) of the light source) input from the control parameter calculation unit 104.

In addition, the screen control unit 107 also controls the screen 108 in accordance with the control parameters (the screen position (Ps), the setting angle (θs) of the screen, the packing density (ds) of the light scattering material of the screen) input from the control parameter calculation unit 104.

By this control, control is implemented such that the cost function has the minimum value, that is, the discomfort index value calculation function described with reference to FIGS. 7 to 9 has the minimum value. As a result, the viewing user can comfortably observe the image on the screen 108 in the image observation optimum area 51 described with reference to FIGS. 7 to 9 and others.

(Step S105)

In step S105, the light source information and the screen information are updated in accordance with settings of the light source and the screen after the control.

This processing is executed under the control of the control unit (data processing unit) not illustrated in FIG. 5.

As described above in the processing of steps S101 to S102, the information acquired in steps S101 and S102, that is, the viewer information (position), the light source information (position, direction, luminance), and the screen information (position, direction, density) are stored in the memory.

However, the light source information (position, direction, luminance) and the screen information (position, direction, density) are changed by the control for the light source 106 and the screen 108 in step S104.

In step S105, data update processing is executed in which the values before the change stored in the memory are replaced by new values after the change, that is, light source information (position, direction, luminance) and screen information (position, direction, density) after the change.

(Step S106)

Next, in step S106, it is detected whether there is a change in the viewer position.

The processing of step S106 is also executed under the control of the control unit (data processing unit) not illustrated in FIG. 5.

The viewer information acquisition unit 102 illustrated in FIG. 5 always monitors the viewer position on the basis of, for example, sensor or camera photographing information, and inputs the position information to the control unit (data processing unit), and in a case where there is a change in the position information, the control unit stores a new value of the position information in the memory.

Further, in a case where a new viewer position is detected, the processing returns to step S102, and on the basis of new position information regarding the user, the processing of step S102 and the subsequent steps are executed.

By this processing, an optimum viewing environment is constructed depending on the new viewer user position.

That is, new control of the light source 106 and the screen 108 is performed such that the new viewing user position is set to the image observation optimum area 51 described with reference to FIGS. 7 to 9 and others.

As a result of the new control, the viewing user can comfortably observe the image on the screen 108 continuously even at the new viewer position.

7. (Second Embodiment) Embodiment in Consideration of Pixel Value Information of Output Image on Screen Next, an embodiment in consideration of pixel value information of an output image on the screen will be described as a second embodiment.

It is assumed that there are various images in the image displayed on the transmission type screen.

For example, there are various images, such as an overall bright image, specifically, for example, a bright daytime outdoor image, or an overall dark image, for example, a night outdoor image.

If an image displayed on the transmission type screen is an overall bright image, a range in which the viewing user feels dazzle becomes wide; however, if the image is an overall dark image, the range in which the viewer feels dazzle becomes narrow.

That is, the areas differ of the image observation optimum area 51 and the image observation inappropriate areas 52 and 53 described with reference to FIGS. 3A, 3B, and 4.

The second embodiment described below is an embodiment in which information regarding the image itself, specifically, pixel value information is applied to control parameter calculation processing.

Figure 13:
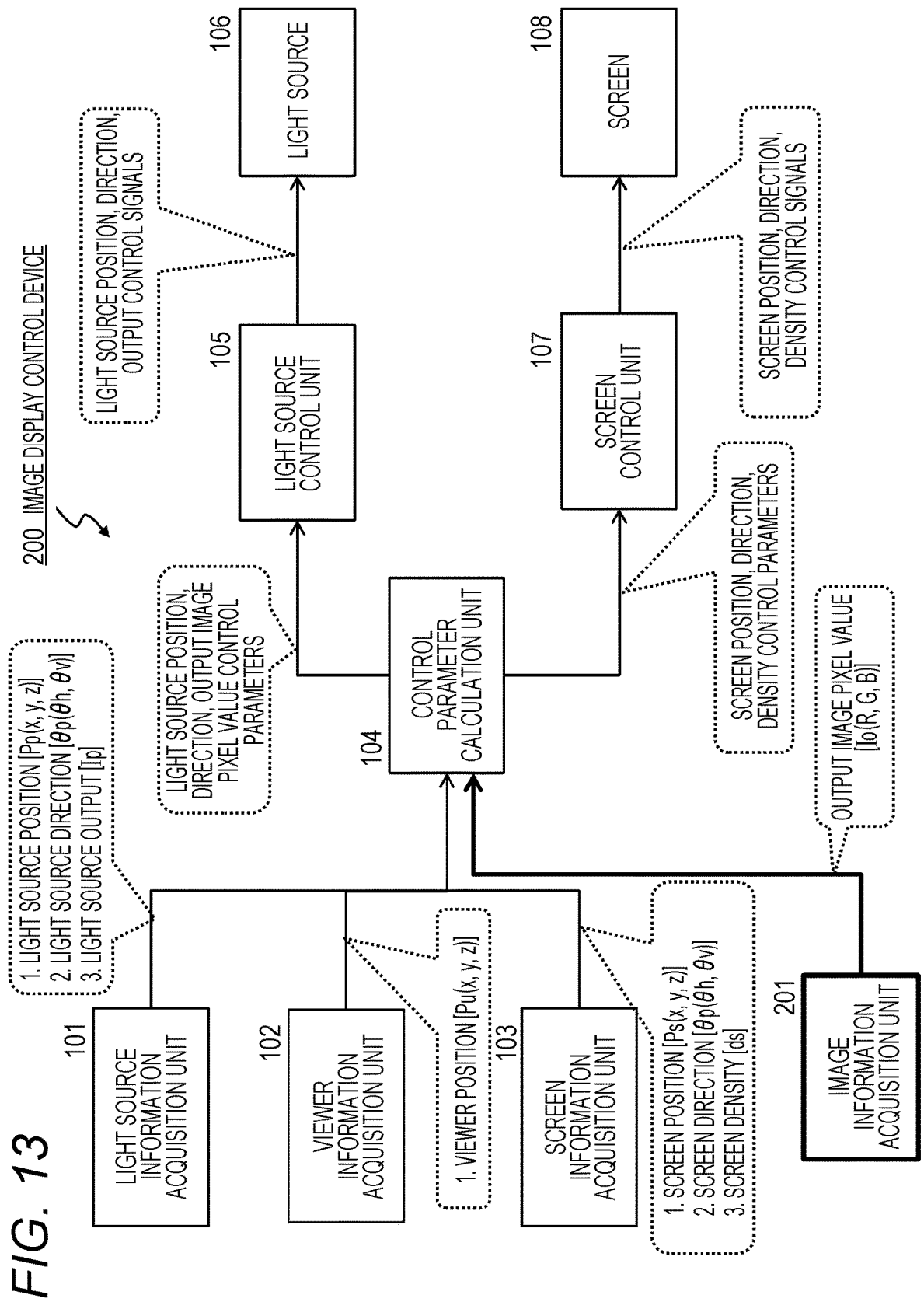
FIG. 13 is a diagram illustrating an example configuration of an image display control device of the present disclosure.

FIG. 13 is a diagram illustrating an example configuration of an image display control device 200 of the second embodiment.

As illustrated in FIG. 13, the image display control device 200 of this embodiment includes a light source information acquisition unit 101, a viewer information acquisition unit 102, a screen information acquisition unit 103, an image information acquisition unit 201, a control parameter calculation unit 104, a light source control unit 105, a light source (projector) 106, a screen control unit 107, and a screen 108.

The configuration of the image display control device 200 illustrated in FIG. 13 corresponds to a configuration in which the image information acquisition unit 201 is added to the configuration of the image display control device 100 described above with reference to FIG. 5.

The image information acquisition unit 201 acquires pixel value information (Io) on an image to be output to the screen 108 by the light source 106, and outputs the pixel value information (Io) to the control parameter calculation unit 104.

Specifically, the pixel value information (Io) is, for example, matrix data including pixel value data of constituent pixels of an image frame constituting a movie or the like output to the screen 108.

Alternatively, for example, an integrated value (sum total) may be used of pixel values for each frame of constituent pixels of an image frame constituting a movie or the like output to the screen 108.

For example, the pixel value information (Io) in a case where the integrated value (sum total) is used of pixel values, is calculated by a calculation formula below.

$$Io = \Sigma R + \sigma G + \Sigma B$$

$\Sigma R$, $\sigma G$, and $\Sigma B$ are respectively integrated values of the pixel values of R, G, and B of all the pixels constituting one image frame.

Note that, in a case where the output image is a still image, the image information acquisition unit 201 acquires pixel value information (Io) for one image frame of the still image, and outputs the pixel value information (Io) to the control parameter calculation unit 104.

In addition, in a case where the output image is a moving image such as a movie, the image information acquisition unit 201 acquires pixel value information (Io) for each image frame, or for image frames at predetermined time intervals, and outputs the pixel value information (Io) to the control parameter calculation unit 104.

An image in which each of the R, G, and B pixel values of the entire image is high is a bright image, and pixel value information (Io) of such a bright image has a large value. On the other hand, an image in which each of the R, G, and B pixel values of the entire image is low is a dark image, and pixel value information (Io) of such a dark image has a small value.

On the basis of the acquired information input from the light source information acquisition unit 101, the viewer information acquisition unit 102, the screen information acquisition unit 103, and further the image information acquisition unit 201, the control parameter calculation unit 104 calculates a discomfort index value indicating a degree of user's discomfort.

Specifically, a discomfort index value calculation function (=cost function C) indicated in an (expression 5) below is applied, and a cost, that is, a discomfort index value is calculated.

$$\text{Cost function } C = C(Pu, Pp, \theta p, Ip, Ps, \theta s, ds, Io) \quad \text{(expression 5)}$$

The (expression 5) is a cost function that calculates a user's discomfort index value on the basis of input information below.

(1) the user position (Pu),
(2) the light source position (Pp),
(3) the light irradiation direction ($\theta p$) of the light source,
(4) the irradiation light intensity (Ip) of light source
(5) the screen position (Ps),
(6) the setting angle ($\theta s$) of the screen,
(7) the packing density (ds) of the light scattering material of the screen
(8) the pixel value information (Io) of the output image Exemplary processing will be described in a case where the control parameter calculation unit 104 applies the cost function (discomfort index value calculation function) indicated in the (expression 5) to calculate control parameters.

The control parameter calculation unit 104 obtains parameters that minimize the user's discomfort index value calculated by the (expression 5) in accordance with an (expression 6) below.

$$\operatorname{argmin}_{Pp, \theta p, Ip, Ps, \theta s, ds} C(Pu, Pp, \theta p, Ip, Ps, \theta s, ds, Io) \quad \text{(expression 6)}$$

Note that, the arithmetic expression indicated in the (expression 6) is an arithmetic expression that calculates parameters Pu, Pp, $\theta p$, Ip, Ps, $\theta s$, ds that minimize a value of the cost function C (expression 5) described above, that is, $$\text{Cost function } C = C(Pu, Pp, \theta p, Ip, Ps, \theta s, ds, Io).$$

Note that, the control parameters calculated in accordance with the (expression 6) are the control parameters of the light source and the control parameters of the screen, and are the following parameters.

(1) the light source position (Pp),
(2) the light irradiation direction ($\theta p$) of the light source,
(3) the irradiation light intensity (Ip) of the light source
(4) the screen position (Ps),
(5) the setting angle ($\theta s$) of the screen, (6) the packing density (ds) of the light scattering material of the screen Note that, in this embodiment, the pixel values of the output image are not controlled. However, a configuration is also possible in which the pixel values of the output image are also controlled. The configuration will be described later in which the pixel values of the output image are also controlled.

The control parameter calculation unit 104 outputs the control parameters calculated in accordance with the (expression 6) to the light source control unit 105 and the screen control unit 107.

The control parameter calculation unit 104 outputs the following control parameters to the light source control unit 105
(1) the light source position (Pp),
(2) the light irradiation direction (θp) of the light source,
(3) the irradiation light intensity (Ip) of the light source Further, the control parameter calculation unit 104 outputs the following control parameters to the screen control unit 107
(4) the screen position (Ps),
(5) the setting angle (θs) of the screen,
(6) the packing density (ds) of the light scattering material of the screen The light source control unit 105 controls the light source 106 in accordance with the control parameters (the light source position (Pp), the light irradiation direction of the light source, the irradiation light intensity (Ip) of the light source) input.

In addition, the screen control unit 107 also controls the screen 108 in accordance with the control parameters (the screen position (Ps), the setting angle (θs) of the screen, the packing density (ds) of the light scattering material of the screen) input.

By this control, control is implemented such that the cost function has the minimum value, that is, the discomfort index value calculation function described with reference to FIGS. 7 to 9, has the minimum value. As a result, the viewing user can comfortably observe the image on the screen 108 in the image observation optimum area 51 described with reference to FIGS. 7 to 9 and others.

A processing sequence will be described executed by the image display control device of the second embodiment illustrated in FIG. 13, with reference to the flowchart illustrated in FIG. 14.

Figure 14:
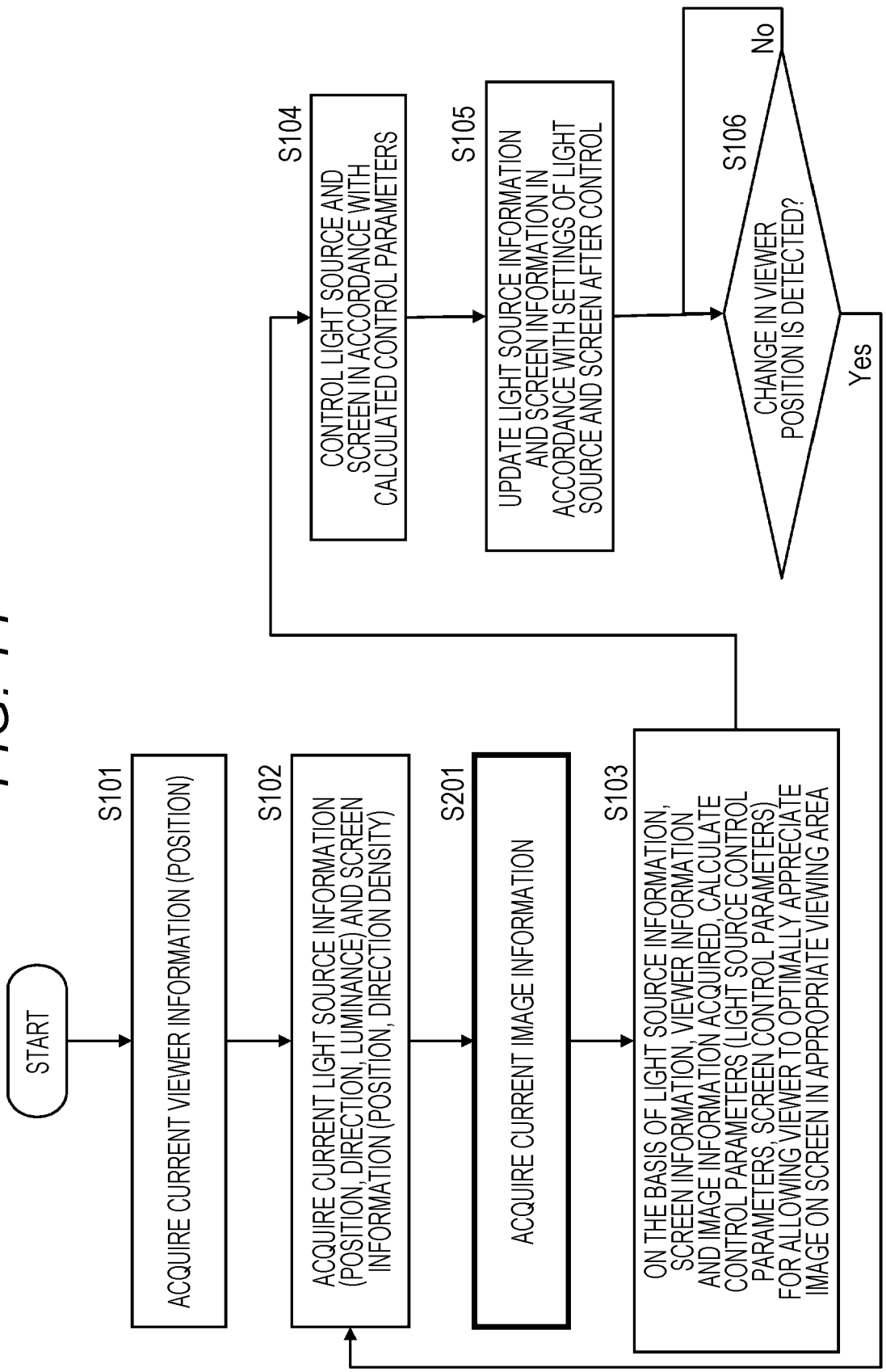
FIG. 14 is a flowchart illustrating a sequence of processing executed by the image display control device of the present disclosure.

The flow illustrated in FIG. 14 is a flow in which the processing of step S201 is added between step S102 and step S103 of the flowchart of the image display control device of the first embodiment described above with reference to FIG. 12.

The processing other than the processing of step S201 is substantially similar processing to the processing of steps of the flow of the image display control device of the first embodiment described above with reference to FIG. 12.

Although not illustrated in FIG. 13, for example, the processing according to the flowchart illustrated in FIG. 14 can be executed under control of a control unit (data processing unit) including a CPU having a program execution function, and the like, in accordance with a program stored in a storage unit of the image display control device.

Hereinafter, the processing will be sequentially described of each step of the flowchart illustrated in FIG. 14.

(Steps S101 and S102)

First, in step S101, current viewer information (position) is acquired.

Next, in step S102, current light source information (position, direction, luminance) and screen information (position, direction, density) are acquired.

These processing steps are executed by the light source information acquisition unit 101, the viewer information acquisition unit 102, and the screen information acquisition unit 103 illustrated in FIG. 13, and are similar to those in the first embodiment described above with reference to the flow of FIG. 12.

(Step S201)

In step S201, current image information is acquired.

This processing is executed in the image information acquisition unit 201 illustrated in FIG. 13.

In the case where the output image is a still image, the image information acquisition unit 201 acquires pixel value information (Io) for one image frame of the still image, and outputs the pixel value information (Io) to the control parameter calculation unit 104.

In addition, in a case where the output image is a moving image such as a movie, the image information acquisition unit 201 acquires pixel value information (Io) for each image frame, or for image frames at predetermined time intervals, and outputs the pixel value information (Io) to the control parameter calculation unit 104.

Note that, the information acquired in steps S101, S102, and S201, that is, the viewer information (position), the light source information (position, direction, luminance), the screen information (position, direction, density), and the pixel value information (Io) are stored in the memory.

(Step S103)

Next, in step S103, on the basis of the acquired viewer information, light source information, and screen information, the control parameters (light source control parameters, screen control parameters) are calculated for allowing the viewer to optimally appreciate the image on the screen in the appropriate viewing area.

This processing is executed by the control parameter calculation unit 104 illustrated in FIG. 13.

On the basis of the acquired information input from the light source information acquisition unit 101, the viewer information acquisition unit 102, the screen information acquisition unit 103, and the image information acquisition unit 201, the control parameter calculation unit 104 calculates control parameters defining a control mode for the light source 106 and control parameters defining a control mode for the screen 108.

As described above, for example, the cost function (discomfort index value calculation function) indicated in the (expression 5), that is, Cost function $C=C(Pu,Pp,\theta p,Ip,Ps,\theta s,ds,Io)$ (expression 5)

is applied, and the control parameters are calculated.

As described above, the control parameter calculation unit 104 obtains the parameters that minimize the user's discomfort index value calculated by the (expression 5) by the following (expression 6).

$\text{argmin}_{Pp,\theta p,Ip,Ps,\theta s,ds}C(Pu,Pp,\theta p,Ip,Ps,\theta s,ds,Io)$ (expression 6)

The control parameters calculated in accordance with the (expression 6) are
the control parameters of the light source and the control parameters of the screen, and are the following parameters.
(1) the light source position (Pp),
(2) the light irradiation direction (θp) of the light source,
(3) the irradiation light intensity (Ip) of the light source
(4) the screen position (Ps),
(5) the setting angle (θs) of the screen, (6) the packing density (ds) of the light scattering material of the screen (Step S104)

Next, in step S104, the light source and the screen are controlled in accordance with the control parameters calculated in step S103.

This processing is executed by the light source control unit 105 and the screen control unit 107 illustrated in FIG. 5.

The light source control unit 105 controls the light source 106 in accordance with the control parameters (the light source position (Pp), the light irradiation direction of the light source, the irradiation light intensity (Ip) of the light source) input from the control parameter calculation unit 104.

In addition, the screen control unit 107 also controls the screen 108 in accordance with the control parameters (the screen position (Ps), the setting angle (θs) of the screen, the packing density (ds) of the light scattering material of the screen) input from the control parameter calculation unit 104.

By this control, control is implemented such that the cost function has the minimum value, that is, the discomfort index value calculation function described with reference to FIGS. 7 to 9 has the minimum value. As a result, the viewing user can comfortably observe the image on the screen 108 in the image observation optimum area 51 described with reference to FIGS. 7 to 9 and others.

(Step S105)

In step S105, the light source information and the screen information are updated in accordance with settings of the light source and the screen after the control.

This processing is executed under the control of the control unit (data processing unit) not illustrated in FIG. 13.

As described above in the processing of steps S101 to S102 and step S201, the information acquired in steps S101, S102, and S201, that is, the viewer information (position), the light source information (position, direction, luminance), the screen information (position, direction, density), and the image information (pixel value information) are stored in the memory.

However, the light source information (position, direction, luminance) and the screen information (position, direction, density) are changed by the control for the light source 106 and the screen 108 in step S104.

In step S105, data update processing is executed in which the values before the change stored in the memory are replaced by new values after the change, that is, light source information (position, direction, luminance) and screen information (position, direction, density) after the change.

(Step S106)

Next, in step S106, it is detected whether there is a change in the viewer position.

The processing of step S106 is also executed under the control of the control unit (data processing unit) not illustrated in FIG. 13.

The viewer information acquisition unit 102 illustrated in FIG. 13 always monitors the viewer position on the basis of, for example, sensor or camera photographing information, and inputs the position information to the control unit (data processing unit), and in a case where there is a change in the position information, the control unit stores a new value of the position information in the memory.

Further, in a case where a new viewer position is detected, the processing returns to step S102, and on the basis of new position information regarding the user, the processing of step S102 and the subsequent steps are executed.

By this processing, an optimum viewing environment is constructed depending on the new viewer user position.

That is, new control of the light source 106 and the screen 108 is performed such that the new viewing user position is set to the image observation optimum area 51 described with reference to FIGS. 7 to 9 and others.

As a result of the new control, the viewing user can comfortably observe the image on the screen 108 continuously even at the new viewer position.

In addition, in this embodiment, in step S201, control is performed using the image information, and optimal control is implemented depending on image characteristics. As described above, in the case where the output image is a still image, the image information acquisition unit 201 acquires pixel value information (Io) for one image frame of the still image, and outputs the pixel value information (Io) to the control parameter calculation unit 104. In addition, in a case where the output image is a moving image such as a movie, the image information acquisition unit 201 acquires pixel value information (Io) for each image frame, or for image frames at predetermined time intervals, and outputs the pixel value information (Io) to the control parameter calculation unit 104.

The control parameter calculation unit 104 executes control parameter update processing on the basis of the pixel value information (Io) corresponding to the image frame, and the control based on the update parameter is performed.

By the control depending on the image characteristics, construction of the optimum viewing environment is implemented depending on the image characteristics. For example, in the case of the moving image, the optimal control is possible depending on the image characteristics of the frames constituting the moving image.

8. (Third Embodiment) Embodiment in which Pixel Values of Output Image are Controlled In the above-described second embodiment, the pixel values of the output image are not controlled.

Hereinafter, as a third embodiment, an embodiment will be described in which the pixel values of the output image are also controlled.

As described above, if an image displayed on the transmission type screen is an overall bright image, a range in which the viewing user feels dazzle becomes wide; however, if the image is an overall dark image, the range in which the viewer feels dazzle becomes narrow.

That is, the areas differ of the image observation optimum area 51 and the image observation inappropriate areas 52 and 53 described with reference to FIGS. 3A, 3B, and 4.

The third embodiment described below is an embodiment in which information regarding the image itself, specifically, pixel value information is applied to control parameter calculation processing, and the pixel values of the output image are also controlled.

Figure 15:
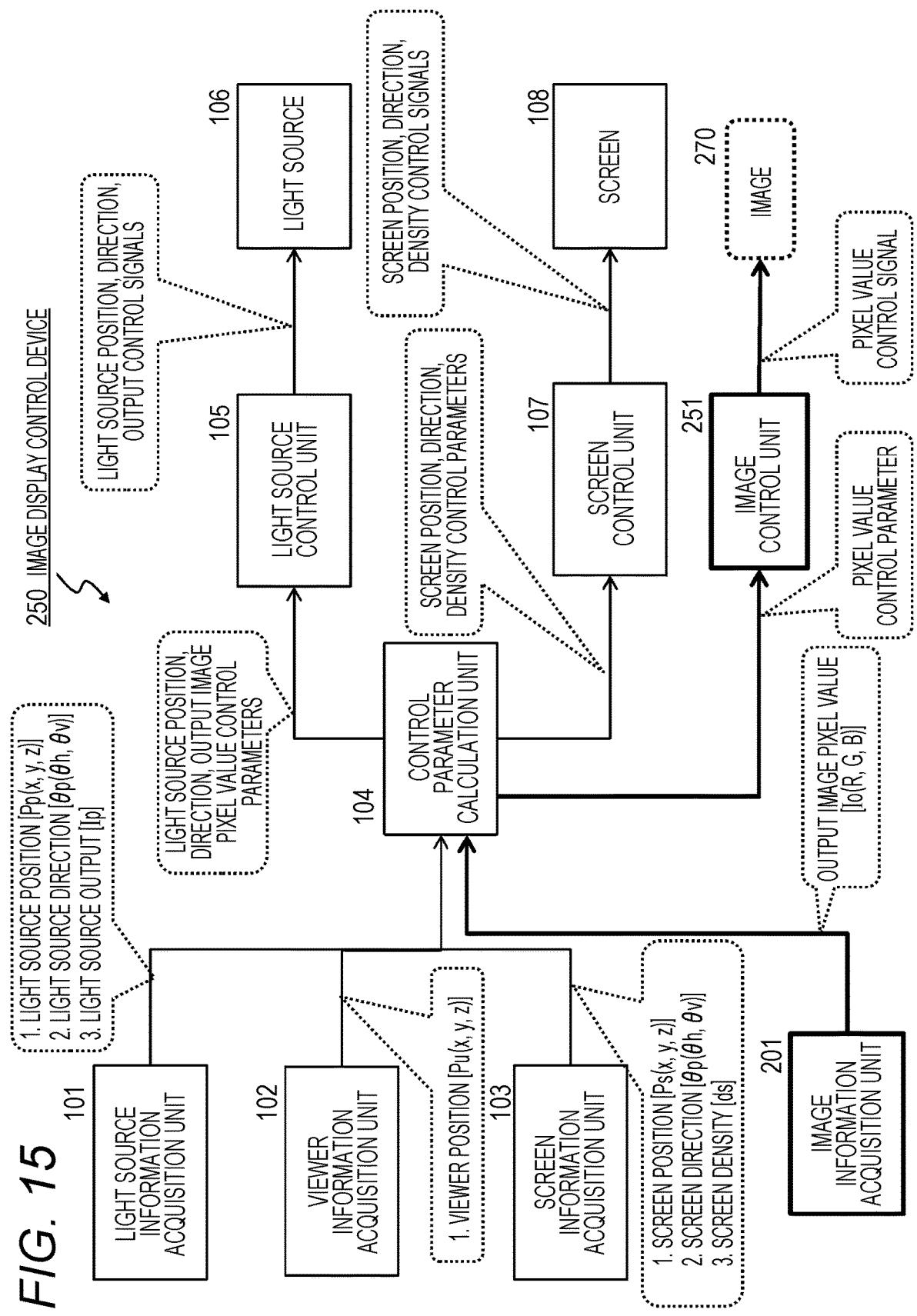
FIG. 15 is a diagram illustrating an example configuration of an image display control device of the present disclosure.

FIG. 15 is a diagram illustrating an example configuration of an image display control device 250 of the third embodiment.

As illustrated in FIG. 15, the image display control device 250 of this embodiment includes a light source information acquisition unit 101, a viewer information acquisition unit 102, a screen information acquisition unit 103, an image information acquisition unit 201, a control parameter calculation unit 104, a light source control unit 105, a light source (projector) 106, a screen control unit 107, a screen 108, and further an image control unit 251.

The configuration of the image display control device 250 illustrated in FIG. 15 corresponds to a configuration in which the image control unit 251 is added to the configuration of the image display control device 200 of the second embodiment described above with reference to FIG. 13.

The image control unit 251 executes control of the pixel values of an image 270 to be output to the screen 108 by the light source 106.

The control parameters are generated by the control parameter calculation unit 104.

The control parameter calculation unit 104 uses the pixel value information (Io) input from the image information acquisition unit 201 to calculate a pixel value control parameter.

Parameter calculation processing will be described executed by the control parameter calculation unit 104.

As described above, an image in which each of the R, G, and B pixel values of the entire image is high is a bright image, and pixel value information (Io) of such a bright image has a large value. On the other hand, an image in which each of the R, G, and B pixel values of the entire image is low is a dark image, and pixel value information (Io) of such a dark image has a small value.

On the basis of the acquired information input from the light source information acquisition unit 101, the viewer information acquisition unit 102, the screen information acquisition unit 103, and further the image information acquisition unit 201, the control parameter calculation unit 104 calculates a discomfort index value indicating a degree of user's discomfort.

A discomfort index value calculation function (=cost function C) used in the third embodiment is a function similar to the function in the second embodiment described above.

That is, a discomfort index value calculation function (=cost function C) indicated in the (expression 5) below is applied, and a cost, that is, a discomfort index value is calculated.

$$\text{Cost function } C = C(Pu, Pp, \theta p, Ip, Ps, \theta s, ds, Io) \quad \text{(expression 5)}$$

The (expression 5) is a cost function that calculates a user's discomfort index value on the basis of input information below.
(1) the user position (Pu),
(2) the light source position (Pp),
(3) the light irradiation direction ($\theta p$) of the light source,
(4) the irradiation light intensity (Ip) of light source
(5) the screen position (Ps),
(6) the setting angle ($\theta s$) of the screen,
(7) the packing density (ds) of the light scattering material of the screen
(8) the pixel value information (Io) of the output image The control parameter calculation unit 104 applies the cost function (discomfort index value calculation function) indicated in the (expression 5) to calculate the control parameters.

In this embodiment, the control parameter calculation unit 104 obtains the parameters that minimize the user's discomfort index value calculated by the (expression 5) in accordance with an (expression 7) below.

$$\operatorname{argmin}_{Pp, \theta p, Ip, Ps, \theta s, ds, Io} C(Pu, Pp, \theta p, Ip, Ps, \theta s, ds, Io) \quad \text{(expression 7)}$$

The arithmetic expression indicated in the (expression 7) is an arithmetic expression that calculates parameters Pu, Pp, $\theta p$, Ip, Ps, $\theta s$, ds, Io that minimize a value of the cost function C (expression 5) described above, that is, $$\text{Cost function } C = C(Pu, Pp, \theta p, Ip, Ps, \theta s, ds, Io).$$

The control parameters calculated in accordance with the (expression 7) include
the control parameters of the light source, the control parameters of the screen, and further the control parameter for the pixel values of the image 270 to be output to the screen 108. That is, the control parameters are the following parameters.
(1) the light source position (Pp),
(2) the light irradiation direction ($\theta p$) of the light source,
(3) the irradiation light intensity (Ip) of the light source
(4) the screen position (Ps),
(5) the setting angle ($\theta s$) of the screen,
(6) the packing density (ds) of the light scattering material of the screen
(7) the pixel value control parameter (Io)

In this embodiment, unlike the second embodiment, the pixel values of the output image are also controlled.

The control parameter calculation unit 104 outputs the control parameters calculated in accordance with the (expression 7) to the light source control unit 105, the screen control unit 107, and the image control unit 251.

The control parameter calculation unit 104 outputs the following control parameters to the light source control unit 105
(1) the light source position (Pp),
(2) the light irradiation direction ($\theta p$) of the light source,
(3) the irradiation light intensity (Ip) of the light source Further, the control parameter calculation unit 104 outputs the following control parameters to the screen control unit 107
(4) the screen position (Ps),
(5) the setting angle ($\theta s$) of the screen,
(6) the packing density (ds) of the light scattering material of the screen Further, the control parameter calculation unit 104 outputs the following control parameter to the image control unit 251
(7) the pixel value control parameter (Io)

The light source control unit 105 controls the light source 106 in accordance with the control parameters (the light source position (Pp), the light irradiation direction of the light source, the irradiation light intensity (Ip) of the light source) input.

In addition, the screen control unit 107 also controls the screen 108 in accordance with the control parameters (the screen position (Ps), the setting angle ($\theta s$) of the screen, the packing density (ds) of the light scattering material of the screen) input.

In addition, the image control unit 251 controls (changes) the pixel values of the image 270 in accordance with the pixel value control parameter (Io) input.

By this control, control is implemented such that the cost function has the minimum value, that is, the discomfort index value calculation function described with reference to FIGS. 7 to 9, has the minimum value. As a result, the viewing user can comfortably observe the image on the screen 108 in the image observation optimum area 51 described with reference to FIGS. 7 to 9 and others.

9. Other Embodiments

In each of the above-described first to third embodiments, an example has been described in a case where there is one light source (projector) to be controlled.

Figure 16:
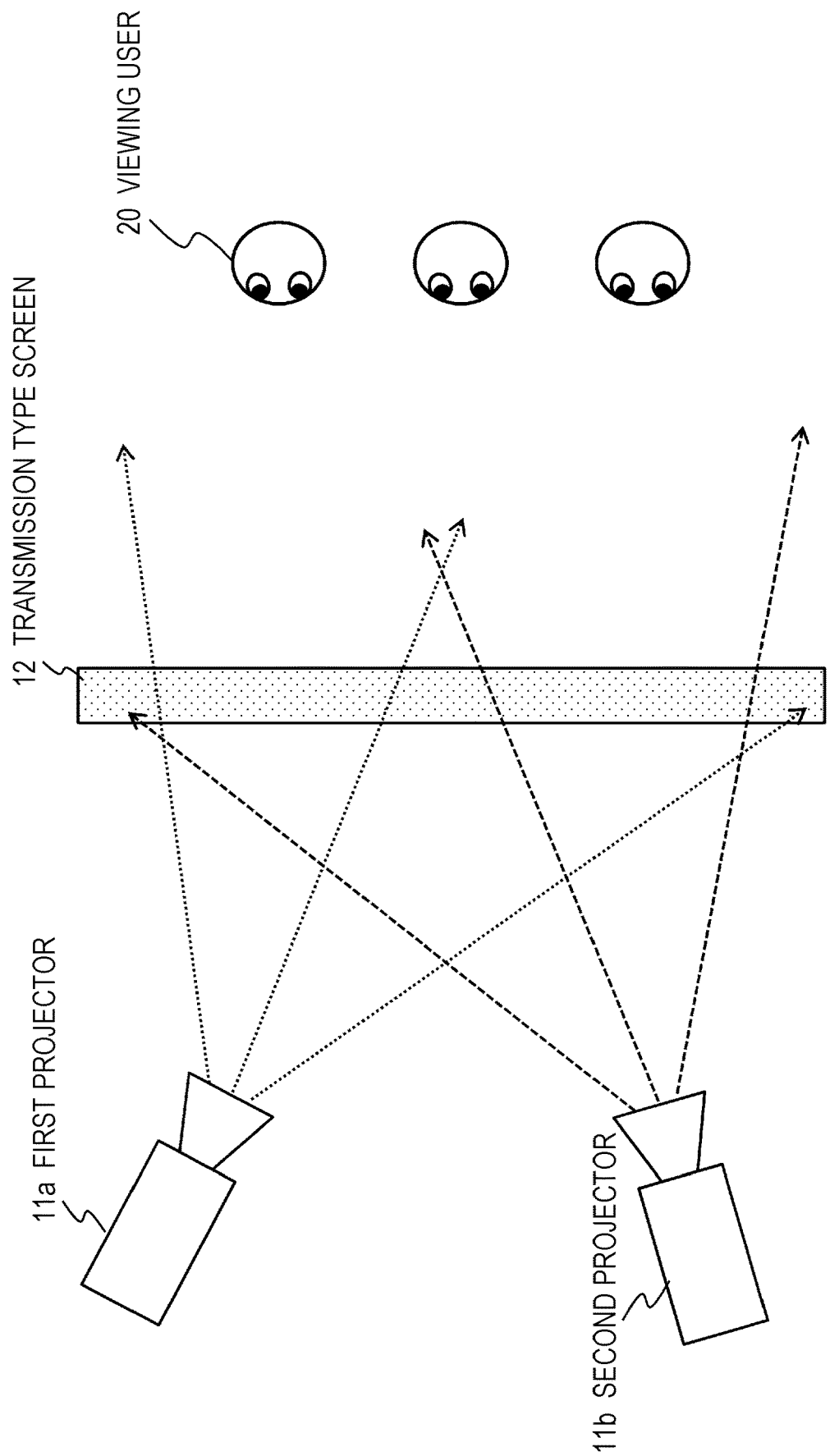
FIG. 16 is a diagram illustrating an example of a display system including a plurality of light sources.

However, as illustrated in FIG. 16, for example, there is a case where images are projected on one transmission type screen 12 by using a plurality of light sources (the first projectors 11a and 11b).

In the case of such a setting, the image observation optimum area 51 and the image observation inappropriate area 52 described above with reference to FIGS. 3A 3B, 4, 7, 8, and 9 are set for each light source (projector).

In such a case, it is necessary to perform control corresponding to each light source.

Specifically, an individual cost function C (discomfort index value calculation function) is calculated corresponding to each light source, and further, parameters are calculated that minimize a value of each cost function C (discomfort index value calculation function).

For each light source, control is executed based on the control parameters calculated on the basis of each cost function C.

However, for the control parameters for the screen, since a plurality of control parameters is calculated depending on the number of light sources, it is necessary to calculate one control parameter from the plurality of control parameters and to perform control.

Specifically, for example, a setting is possible such as to employ an average value of the plurality of control parameters.

By performing such control, even in a case where there is the plurality of light sources, the viewing user can comfortably observe the image on the screen 108 in the image observation optimum area 51 described with reference to FIGS. 7 to 9 and others.

In addition, various types of screens can be used as the transmission type screen.

Water droplets or water vapor, actual fog or rain, or the like can also be used. Further, various materials can be used as the screen, such as transparent film, glass, windows, windshields, and show windows.

The light source is not limited to the projector, but a headlight of a car, interiors, sunlight, and the like can be used, for example.

However, in a case where uncontrollable light sources are used, such as sunlight, these light sources are not controlled, and the light source information is used for calculation of the cost function and calculation of control parameters of controllable objects such as the screen.

10. Example Hardware Configuration of Information Processing Device

Next, an example hardware configuration of the image display control device will be described with reference to FIG. 17.

Figure 17:
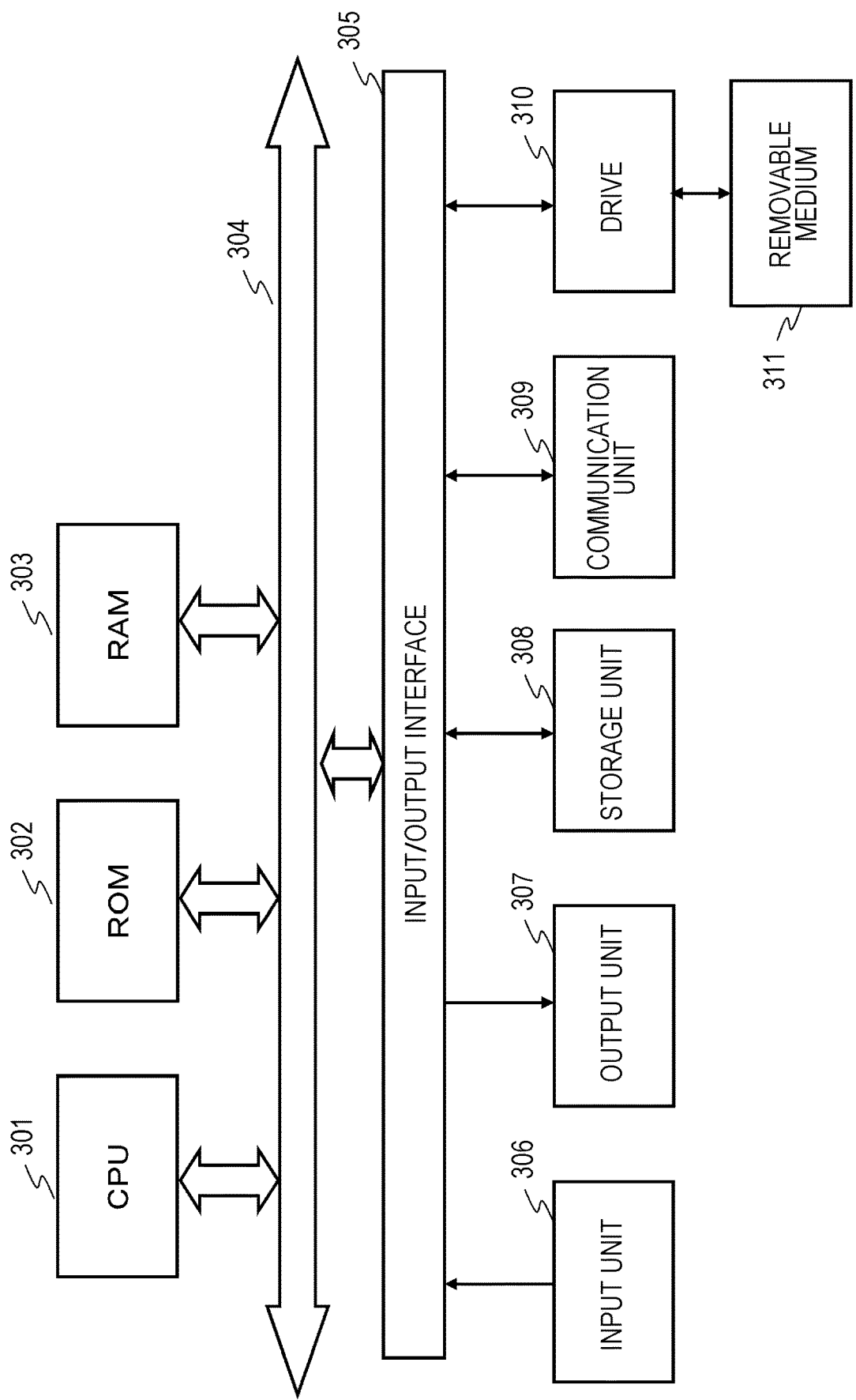
FIG. 17 is a diagram illustrating an example configuration of hardware of an information processing device.

FIG. 17 is a diagram illustrating the example hardware configuration of the image display control device that executes processing of the present disclosure.

A Central Processing Unit (CPU) 301 functions as a control unit or a data processing unit that executes various types of processing in accordance with a program stored in Read Only Memory (ROM) 302 or a storage unit 308. For example, the processing is executed according to the sequence described in the above-described embodiments. Random Access Memory (RAM) 303 stores the program executed by the CPU 301, data, and the like. These CPU 301, ROM 302, and RAM 303 are connected to each other by a bus 304.

The CPU 301 is connected to an input/output interface 305 via the bus 304, and the input/output interface 305 is connected to an input unit 306 including various user-input switches, a keyboard, a mouse, a microphone, and the like, and an output unit 307 that executes data output to a display unit, a speaker, and the like. The CPU 301 executes various types of processing in response to commands input from the input unit 306, and outputs processing results to the output unit 307, for example.

The storage unit 308 connected to the input/output interface 305 includes, for example, a hard disk or the like, and stores the program executed by the CPU 301 and various data. A communication unit 309 functions as a transmission/reception unit for Wi-Fi communication, Bluetooth (registered trademark) (BT) communication, and other data communication via a network such as the Internet and a local area network, and communicates with an external device.

A drive 310 connected to the input/output interface 305 drives a removable medium 311 such as a magnetic disk, an optical disk, a magneto-optical disk, or a semiconductor memory such as a memory card, and executes data recording or reading.

11. Summary of Configuration of the Present Disclosure

In the above, the embodiments of the present disclosure have been described in detail with reference to specific embodiments. However, it is self-evident that those skilled in the art can make modifications and substitutions of the embodiments without departing from the gist of the present disclosure. That is, the present invention has been disclosed in the form of exemplification, and should not be interpreted restrictively. In order to judge the gist of the present disclosure, the scope of claims should be taken into consideration.

Note that, the technology disclosed in this specification can have the following configuration.

(1) An image display control device including:
a light source that executes image output to a transmission type screen;
the transmission type screen that receives irradiation light from the light source;
a control unit that controls at least one of the light source or the transmission type screen; and
a control parameter calculation unit that calculates a control parameter defining a control mode of the control unit, in which
the control parameter calculation unit
sets, as input information, position information of a viewing user observing an image on the transmission type screen, and setting information of at least one of the light source or the transmission type screen, and
on the basis of the input information, applies a discomfort index value calculation function that calculates a discomfort index value of image observation by the viewing user, to calculate a control parameter that minimizes a value of the discomfort index value calculation function, and outputs the control parameter to the control unit, and
the control unit executes control based on the control parameter.

(2) The image display control device according to (1), in which
the control parameter calculation unit
inputs light source setting information including at least one of a light irradiation intensity, a light irradiation direction, or a position of the light source, as the input information, and
applies a discomfort index value calculation function using the input information, to calculate a control parameter including at least one of the light irradiation intensity, the light irradiation direction, or the position of the light source, and outputs the control parameter to the control unit.

(3) The image display control device according to (1) or (2), in which the control parameter calculation unit inputs screen setting information including at least one of a density of a light scattering material, a setting direction, or a position of the transmission type screen, as the input information, and applies a discomfort index value calculation function using the input information, to calculate a control parameter including at least one of the density of the light scattering material, the setting direction, or the position of the transmission type screen, and outputs the control parameter to the control unit.

(4) The image display control device according to any of (1) to (3), in which the control parameter calculation unit inputs pixel value information of an image to be output to the transmission type screen, as the input information, and applies a discomfort index value calculation function using the pixel value information, to calculate a control parameter that minimizes a value of the discomfort index value calculation function.

(5) The image display control device according to any of (1) to (4), further including an image control unit that controls a pixel value of an image to be output to the transmission type screen, in which the control parameter calculation unit inputs pixel value information of the image to be output to the transmission type screen, as the input information, and applies a discomfort index value calculation function using the input information, to calculate a pixel value control parameter of the image, and outputs the pixel value control parameter to the image control unit, and the image control unit executes pixel value control based on the control parameter.

(6) The image display control device according to any of (1) to (5), in which the discomfort index value calculation function is a function having a minimum value in an image observation optimum area in which the viewing user is enabled to observe the image on the transmission type screen without letting the irradiation light of the light source directly enter a field of view of the viewing user.

(7) The image display control device according to any of (1) to (6), in which the discomfort index value calculation function is a function having a maximal value in an image observation inappropriate area in which the irradiation light of the light source directly enters a field of view of the viewing user when the viewing user observes the image on the transmission type screen.

(8) The image display control device according to any of (1) to (7), in which the control parameter calculation unit uses a function $C=C(Pu, Pp, \theta p)$ as the discomfort index value calculation function, the function C being based on input information:
(1) a viewing user position (Pu),
(2) a light source position (Pp), and
(3) a light irradiation direction ($\theta p$) of the light source.

(9) The image display control device according to (8), in which the control parameter calculation unit calculates a light source position (Pp) and a light irradiation direction ($\theta p$) of the light source that minimize a value of the function $C=C(Pu, Pp, \theta p)$ used as the discomfort index value calculation function, and outputs calculated values as control parameters to the control unit.

(10) The image display control device according to any of (1) to (7), in which the control parameter calculation unit uses a function $C=C(Pu, Pp, \theta p, Ip)$ as the discomfort index value calculation function, the function C being based on input information:
(1) a viewing user position (Pu),
(2) a light source position (Pp),
(3) a light irradiation direction ($\theta p$) of the light source, and
(4) an irradiation light intensity (Ip) of the light source.

(11) The image display control device according to (10), in which the control parameter calculation unit calculates a light source position (Pp), a light irradiation direction ($\theta p$) of the light source, and an irradiation light intensity (Ip) of the light source that minimize a value of the function $C=C(Pu, Pp, \theta p, Ip)$ used as the discomfort index value calculation function, and outputs calculated values as control parameters to the control unit.

(12) The image display control device according to any of (1) to (7), in which the control parameter calculation unit uses a function $C=C(Pu, Pp, \theta p, Ip, Ps, \theta s, ds)$ as the discomfort index value calculation function, the function C being based on input information:
(1) a viewing user position (Pu),
(2) a light source position (Pp),
(3) a light irradiation direction ($\theta p$) of the light source,
(4) an irradiation light intensity (Ip) of the light source,
(5) a screen position (Ps),
(6) a setting angle ($\theta s$) of the screen, and
(7) a packing density (ds) of a light scattering material of the screen.

(13) The image display control device according to (12), in which the control parameter calculation unit calculates a light source position (Pp), a light irradiation direction ($\theta p$) of the light source, an irradiation light intensity (Ip) of the light source, a screen position (Ps), a setting angle ($\theta s$) of the screen, and a packing density (ds) of the light scattering material of the screen that minimize a value of the function $C=C(Pu, Pp, \theta p, Ip, Ps, \theta s, ds)$ used as the discomfort index value calculation function, and outputs calculated values as control parameters to the control unit.

(14) An image display control method including executing image display control in an image display control device, in which the image display control device includes:

a light source that executes image output to a transmission type screen;

the transmission type screen that receives irradiation light from the light source;

a control unit that controls at least one of the light source or the transmission type screen; and a control parameter calculation unit that calculates a control parameter defining a control mode of the control unit, in which the control parameter calculation unit sets, as input information, position information of a viewing user observing an image on the transmission type screen, and setting information of at least one of the light source or the transmission type screen, and on the basis of the input information, applies a discomfort index value calculation function that calculates a discomfort index value of image observation by the viewing user, to calculate a control parameter that minimizes a value of the discomfort index value calculation function, and outputs the control parameter to the control unit, and the control unit executes control based on the control parameter.

(15) A program for causing an image display control device to execute image display control, the image display control device including:

a light source that executes image output to a transmission type screen;

the transmission type screen that receives irradiation light from the light source;

a control unit that controls at least one of the light source or the transmission type screen; and a control parameter calculation unit that calculates a control parameter defining a control mode of the control unit, the program causing the control parameter calculation unit to execute processing that sets, as input information, position information of a viewing user observing an image on the transmission type screen, and setting information of at least one of the light source or the transmission type screen, and on the basis of the input information, applies a discomfort index value calculation function that calculates a discomfort index value of image observation by the viewing user, to calculate a control parameter that minimizes a value of the discomfort index value calculation function, and outputs the control parameter to the control unit, and causing the control unit to execute control based on the control parameter.

In addition, the series of processing steps described in the specification can be executed by hardware, software, or a combination of both. In the case of executing processing by software, it is possible to install and execute a program recording the processing sequence in a memory in a computer incorporated in dedicated hardware, or to install and execute the program in a general-purpose computer capable of executing various types of processing. For example, the program can be recorded in a recording medium in advance. In addition to installing from the recording medium to the computer, the program can be received via a network such as a local area network (LAN), the Internet, or the like, and installed in the recording medium such as a built-in hard disk.

Note that, the various types of processing described in the specification are not only executed in chronological order in accordance with the description but also may be executed in parallel or individually depending on the processing capability of the device that executes the processing or depending on necessity. In addition, in this specification, the term "system" is a logical group configuration of a plurality of devices, and is not limited to the one in which the devices of each configuration are in the same housing.

INDUSTRIAL APPLICABILITY

As described above, according to the configuration of an embodiment of the present disclosure, a configuration is implemented that performs control enabling comfortable observation of the display image on the transmission type screen.

Specifically, the configuration includes a light source that executes image output to a transmission type screen, the transmission type screen that receives irradiation light from the light source, a control unit that controls at least one of the light source or the transmission type screen, and a control parameter calculation unit that calculates a control parameter defining a control mode of the control unit. The control parameter calculation unit sets, as input information, position information of a viewing user observing an image on the transmission type screen, and setting information of at least one of the light source or the transmission type screen, and on the basis of the input information, applies a discomfort index value calculation function that calculates a discomfort index value of image observation by the viewing user, to calculate a control parameter that minimizes a value of the discomfort index value calculation function, and outputs the control parameter to the control unit, and the control unit executes control of the light source or the screen on the basis of the control parameter.

With this configuration, a configuration is implemented that performs control enabling comfortable observation of the display image on the transmission type screen.

REFERENCE SIGNS LIST

11 Projector
12 Transmission type screen
20 Viewing user
51 Image observation optimum area
52, 53 Image observation inappropriate area
100 Image display control device
101 Light source information acquisition unit
102 Viewer information acquisition unit
103 Screen information acquisition unit
104 Control parameter calculation unit
105 Light source control unit
106 Light source (projector)
107 Screen control unit
108 Screen
120 Viewing user
121, 122 Light source drive mechanism
200 Image display control device
201 Image information acquisition unit
250 Image display control device
251 Image control unit
270 Image
301 CPU
302 ROM
303 RAM
304 Bus
305 Input/output interface
306 Input unit
307 Output unit
308 Storage unit
309 Communication unit
310 Drive
311 Removable medium

The invention claimed is:

1. An image display control device, comprising:
a Central Processing Unit (CPU) configured to:
set, as input information, a position information of a viewing user that observes an image on a transmission type screen and setting information of at least one of a light source or the transmission type screen, wherein
the light source outputs the image, and
the transmission type screen receives irradiation light from the light source;
apply a discomfort index value calculation function based on the input information, wherein the discomfort index value calculation function calculates a discomfort index value of the image observation by the viewing user;
calculate a control parameter based on the applied discomfort index value calculation function;
output the control parameter; and
control the at least one of the light source or the transmission type screen based on the control parameter.

2. The image display control device according to claim 1, wherein the CPU is further configured to:
input light source setting information as the input information, wherein the light source setting information includes at least one of a light irradiation intensity, a light irradiation direction, or a position of the light source;
apply the discomfort index value calculation function based on the input information;
calculate the control parameter based on the applied discomfort index value calculation function, wherein the control parameter includes at least one of the light irradiation intensity, the light irradiation direction, or the position of the light source; and
output the control parameter.

3. The image display control device according to claim 1, wherein the CPU is further configured to:
input screen setting information as the input information, wherein the screen setting information includes at least one of a density of a light scattering material, a setting direction, or a position of the transmission type screen;
apply the discomfort index value calculation function based on the input information;
calculate the control parameter based on the applied discomfort index value calculation function, wherein the control parameter includes at least one of the density of the light scattering material, the setting direction, or the position of the transmission type screen; and
output the control parameter.

4. The image display control device according to claim 1, wherein the CPU is further configured to:
input pixel value information of the image to be output to the transmission type screen, as the input information;
apply the discomfort index value calculation function based on the pixel value information; and
calculate the control parameter that minimizes a value of the discomfort index value calculation function.

5. The image display control device according to claim 1, wherein the CPU is further configured to:
control a pixel value of the image to be output to the transmission type screen;
input pixel value information of the image to be output to the transmission type screen, as the input information;
apply the discomfort index value calculation function based on the input information;
calculate a pixel value control parameter of the image;
output the pixel value control parameter; and
control the pixel value based on the pixel value control parameter.

6. The image display control device according to claim 1, wherein
the discomfort index value calculation function is a function having a minimum value in an image observation optimum area in which the viewing user is enabled to observe the image on the transmission type screen without letting the irradiation light of the light source directly enter a field of view of the viewing user.

7. The image display control device according to claim 1, wherein
the discomfort index value calculation function is a function having a maximal value in an image observation inappropriate area in which the irradiation light of the light source directly enters a field of view of the viewing user that observes the image on the transmission type screen.

8. The image display control device according to claim 1, wherein
the CPU is further configured to use a function $C=C(Pu, Pp, \theta p)$ as the discomfort index value calculation function, and
the function C is based on input information that includes:
a viewing user position (Pu),
a light source position (Pp), and
a light irradiation direction ($\theta p$) of the light source.

9. The image display control device according to claim 8, wherein
the CPU is further configured to:
calculate the light source position (Pp) and the light irradiation direction ($\theta p$) of the light source that minimize a value of the function $C=C(Pu, Pp, \theta p)$ used as the discomfort index value calculation function; and
output the light source position (Pp) and the light irradiation direction ($\theta p$) as control parameters.

10. The image display control device according to claim 1, wherein
the CPU is further configured to use a function $C=C(Pu, Pp, \theta p, Ip)$ as the discomfort index value calculation function, and
the function C is based on input information that includes:
a viewing user position (Pu),
a light source position (Pp),
a light irradiation direction ($\theta p$) of the light source, and
an irradiation light intensity (Ip) of the light source.

11. The image display control device according to claim 10, wherein
the CPU is further configured to:
calculate the light source position (Pp), the light irradiation direction ($\theta p$) of the light source, and the irradiation light intensity (Ip) of the light source that minimize a value of the function $C=C(Pu, Pp, \theta p, Ip)$ used as the discomfort index value calculation function; and
output the light source position (Pp), the light irradiation direction ($\theta p$), and the irradiation light intensity (Ip) as control parameters.

12. The image display control device according to claim 1, wherein
the CPU is further configured to use a function $C=C(Pu, Pp, \theta p, Ip, Ps, es, ds)$ as the discomfort index value calculation function, and
the function C is based on input information that includes:
a viewing user position (Pu),
a light source position (Pp),
a light irradiation direction ($\theta p$) of the light source,
an irradiation light intensity (Ip) of the light source, a screen position (Ps),
a setting angle (θs) of the transmission type screen, and
a packing density (ds) of a light scattering material of the transmission type screen.

13. The image display control device according to claim 12, wherein
the CPU is further configured to:
calculate the light source position (Pp), the light irradiation direction (θp) of the light source, the irradiation light intensity (Ip) of the light source, the screen position (Ps), the setting angle (θs) of the transmission type screen, and the packing density (ds) of the light scattering material of the transmission type screen that minimize a value of the function C=C(Pu, Pp, θp, Ip, Ps, θs, ds) used as the discomfort index value calculation function; and
output the light source position (Pp), the light irradiation direction (θp), the irradiation light intensity (Ip), the screen position (Ps), the setting angle (θs), and the packing density (ds) as control parameters.

14. An image display control method, comprising:
in an image display control device comprising a central processing unit (CPU):
setting, by the CPU, position information of a viewing user observing an image on a transmission type screen and setting information of at least one of a light source or the transmission type screen as input information, wherein
the light source outputs the image, and
the transmission type screen receives irradiation light from the light source;
applying, by the CPU, a discomfort index value calculation function based on the input information, wherein the discomfort index value calculation function calculates a discomfort index value of the image observation by the viewing user;
calculating, by the CPU, a control parameter based on the applied discomfort index value calculation function;
outputting, by the CPU, the control parameter; and
controlling, by the CPU, the at least one of the light source or the transmission type screen based on the control parameter.

15. A non-transitory computer-readable medium having stored thereon, computer-executable instructions which, when executed by a computer, cause the computer to execute operations, the operations comprising:
setting, as input information, position information of a viewing user observing an image on a transmission type screen and setting information of at least one of a light source or the transmission type screen, wherein
the light source outputs the image, and
the transmission type screen receives irradiation light from the light source;
applying a discomfort index value calculation function based on the input information, wherein the discomfort index value calculation function calculates a discomfort index value of the image observation by the viewing user;
calculating a control parameter based on the applied discomfort index value calculation function;
outputting the control parameter; and
controlling the at least one of the light source or the transmission type screen based on the control parameter.

* * * * *